United States Patent
Morishita et al.

(10) Patent No.: US 10,542,102 B2
(45) Date of Patent: Jan. 21, 2020

(54) SERVER DEVICE

(71) Applicant: GungHo Online Entertainment, Inc., Tokyo (JP)

(72) Inventors: Kazuki Morishita, Tokyo (JP); Daisuke Yamamoto, Tokyo (JP); Kenji Kobayashi, Tokyo (JP); Koichi Nobori, Tokyo (JP); Tomoyuki Morishita, Tokyo (JP); Hajime Miyajima, Tokyo (JP); Atsuo Kamiya, Tokyo (JP); Satoru Obana, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 790 days.

(21) Appl. No.: 15/183,250

(22) Filed: Jun. 15, 2016

(65) Prior Publication Data

US 2017/0245100 A1   Aug. 24, 2017

Related U.S. Application Data

(63) Continuation of application No. PCT/JP2016/054668, filed on Feb. 18, 2016.

(51) Int. Cl.
*A63F 9/24* (2006.01)
*H04L 29/08* (2006.01)
(Continued)

(52) U.S. Cl.
CPC .............. *H04L 67/18* (2013.01); *A63F 13/35* (2014.09); *H04W 4/02* (2013.01)

(58) Field of Classification Search
CPC  H04W 4/02; A63F 13/25; A63F 13/35; A63F 13/216; A63F 13/30
See application file for complete search history.

(56) References Cited

U.S. PATENT DOCUMENTS 8,608,570 B1 *  12/2013  Mahajan ................. A63F 13/79
                                                      273/274
9,669,296 B1 *  6/2017   Hibbert .................... A63F 13/12
                         (Continued)

FOREIGN PATENT DOCUMENTS

JP    2012-005652 A   1/2012
JP    2012-024416 A   2/2012

OTHER PUBLICATIONS

How to Play Touch My Katannari's Downloadable Content. justpushstart.com. Online. Mar. 1, 2015. Accessed via the Internet. Accessed Feb. 1, 2019. <URL: https://web.archive.org/web/20120301103402/https://www.justpushstart.com/2012/02/how-to-play-touch-my-katamaris-downloadable-content/> (Year: 2015).*

(Continued)

*Primary Examiner* — Dmitry Suhol
*Assistant Examiner* — Carl V Larsen
(74) *Attorney, Agent, or Firm* — Harness, Dickey & Pierce, P.L.C.

(57) ABSTRACT

A server device is provided that provides a user with a mode for assigning newer privileges. The server device includes: a communication unit for receiving, from a terminal device, position information indicating a position of the terminal device in the real world, the terminal device being held by a user, and a first application being executed in the terminal device; a memory unit for storing a plurality of items stored in correspondence with prescribed locations in the real world; and a control unit for assigning to the user a privilege usable in a second application different from the first application, on the basis of one or more items that are selected by the user from the plurality of items stored in the memory unit and that are arranged in correspondence with locations within a prescribed range from the real-world position indicated by the position information.

16 Claims, 16 Drawing Sheets

(51) Int. Cl.
   *A63F 13/35* (2014.01)
   *H04W 4/02* (2018.01)

(56) References Cited

U.S. PATENT DOCUMENTS

| | | | | |
|---|---|---|---|---|
| 2002/0090985 | A1* | 7/2002 | Tochner | A63F 13/12 463/1 |
| 2003/0032476 | A1* | 2/2003 | Walker | G06Q 20/00 463/25 |
| 2008/0167129 | A1* | 7/2008 | Aaron | A63F 13/10 463/42 |
| 2009/0005140 | A1* | 1/2009 | Rose | A63F 13/00 463/7 |
| 2013/0074197 | A1* | 3/2013 | Shelton | G06F 21/125 726/28 |
| 2013/0122993 | A1* | 5/2013 | Caldwell | A63F 13/79 463/25 |
| 2014/0349721 | A1* | 11/2014 | Dawson | A63F 13/216 463/1 |
| 2015/0024783 | A1* | 1/2015 | Konno | A63F 13/30 455/456.3 |
| 2015/0080131 | A1* | 3/2015 | Bacon | A63F 13/216 463/42 |
| 2016/0092923 | A1* | 3/2016 | Grenier | G06F 16/9537 705/14.36 |
| 2018/0043253 | A1* | 2/2018 | Auterio | A63F 13/00 |

OTHER PUBLICATIONS

PS Vita Near Tip. Youtube.com. Online Mar. 5, 2012. Online. Accessed via the Internet. Accessed Feb. 1, 2019. <URL: https://www.youtube.com/watch?v=oJcIVcXBFx0> (Year: 2012).*

Google Play Games: Sign in Best Practices. Youtube.com. Online. May 10, 2015. Accessed via the Internet. Accessed Feb. 1, 2019. < URL: https://www.youtube.com/watch?v=KPapbl8R9ws> (Year: 2015).*

International Search Report and Written Opinion for PCT/JP2016/054668, dated Apr. 19, 2016; ISA/JP.

Ingress: Real encampment battle game made by Google, [online], Aug. 2, 2014, URL:http://www.appbank.net/2014/08/02/iphone-application/868470.php.

"Pokemon GO" first released video, [online], Sep. 9, 2015, URL:https://www.youtube.com/watch?v=1KUwVYUKii4.

* cited by examiner

| Item ID | Class | Position | Period |
|---|---|---|---|
| A | 1 | (N1,E1) | – |
| B | 1 | (N2,E2) | – |
| C | 2 | (N3,E3) | 0:00AM-9:30AM |
| D | 3 | (N4,E4) | 10:00AM-0:00PM |
| E | 1 | (N5,E5) | 0:00AM-23:59PM |
| F | 4 | (N6,E6) | 6:00AM-6:00PM |
| G | 5 | (N7,E7) | – |
| ⋮ | ⋮ | ⋮ | ⋮ |

FIG. 6

| Privilege ID | Acquisition cost | Privilege content | Time limit |
|---|---|---|---|
| A | Item Class 1 × 3 | Open Stage A | - |
| B | Item Class 2 × 5 | Open Stage B for 1 hour | Monday |
| C | Item Class 3 × 5 | Open Stage c for 2 hours | - |
| D | Item Class 4 × 5 | Open Stage D | Monthly 10th- 15th |
| E | Item Class 5 × 3 | Open Stage E for 1 hour | - |
| ⋮ | ⋮ | ⋮ | ⋮ |

FIG. 7

| User ID | User name | Acquired item classes | | | | | | | | Position | Privilege |
|---|---|---|---|---|---|---|---|---|---|---|---|
| | | 1 | 2 | 3 | 4 | a | b | c | d | | |
| I | User (a) | 1 | 2 | 0 | 3 | 5 | 25 | 10 | 99 | (X1,Y1) | A |
| II | User (b) | - | - | - | - | 0 | 65 | 30 | 20 | (X2,Y2) | b |
| III | User (c) | 0 | 0 | 1 | 1 | 80 | 65 | 45 | 20 | (X3,Y3) | - |
| IV | User (d) | 5 | 0 | 0 | 1 | 60 | 0 | 2 | 78 | (X4,Y4) | D |
| V | User (e) | - | - | - | - | 99 | 10 | 55 | 60 | (X5,Y5) | - |
| ⋮ | ⋮ | ⋮ | ⋮ | ⋮ | ⋮ | ⋮ | ⋮ | ⋮ | ⋮ | ⋮ | ⋮ |

FIG. 8

| User ID | User name | Rank | Game date | Privilege Notice |
|---|---|---|---|---|
| I | User A | 100 | A | A |
| II | User B | 50 | B | b |
| III | User C | 30 | C | - |
| IV | User D | 56 | D | D |
| V | User E | 89 | E | - |
| ⋮ | ⋮ | ⋮ | ⋮ | ⋮ |

| Item ID | Class | Position |
|---|---|---|
| a | 11 | (N8,E8) |
| b | 12 | (N9,E9) |
| c | 11 | (N10,E10) |
| d | 13 | (N11,E11) |
| ⋮ | ⋮ | ⋮ |

| Privilege ID | Acquisition Cost | Privilege content | Time Limit |
|---|---|---|---|
| A | Item class 1 × 3 | Open stage A | – |
| B | Item class 2 × 5 | Open stage for 1 hour | Monday |
| C | Item class 3 × 5 | Open stage C for 2 hours | – |
| D | Item class 4 × 5 | Open stage D | Monthly 10th–15th |
| E | Item class 5 × 3 | Open stage E for 1 hour | – |
| a | Item class 11 × 99 | Open stage a | – |
| b | Item class 12 × 99 | Open stage b | – |
| ⋮ | ⋮ | ⋮ | ⋮ |

SERVER DEVICE

This application is a continuation of International application No. PCT/JP2016/054668, filed on Feb. 18, 2016, entitled "SERVER DEVICE", which is hereby expressly incorporated by reference herein in its entirety.

TECHNICAL FIELD

The present disclosure relates to a server device capable of assigning prescribed privileges to users.

BACKGROUND

Server devices for executing games using position information of terminal devices in the real world are known from the past. For example, Japanese Laid-Open Patent Application 2012-005652 describes that position information of a terminal device in the real world is obtained by GPS during execution of a game, the obtained position information is provided to a server device, and the server device assigns a privilege to the user in accordance with the provided position information.

SUMMARY

In consideration of the art as mentioned above, in the present disclosure, various embodiments are used to provide users with modes for assigning newer privileges.

According to one aspect of the present disclosure, there is provided a server device comprising: a communication unit for receiving, from a terminal device, position information indicating a position of the terminal device in the real world, the terminal device being held by a user, and a first application being executed in the terminal device; a memory unit for storing a plurality of items stored in correspondence with prescribed locations in the real world; and a control unit for assigning to the user a privilege usable in a second application different from the first application, on the basis of one or more items that are selected by the user from the plurality of items stored in the memory unit and that are arranged in correspondence with locations within a prescribed range from the real-world position indicated by the position information.

According to one aspect of the present disclosure, there is provided a non-transitory computer-readable medium in which a computer program is stored, the computer program enabling a computer that comprises a memory unit for storing a plurality of items stored in correspondence with prescribed locations in the real world to function as: a communication unit for receiving, from a terminal device, position information indicating a position of the terminal device in the real world, the terminal device being held by a user, and a first application being executed in the terminal device; and a control unit for assigning to the user a privilege usable in a second application different from the first application, on the basis of one or more items that are selected by the user from the plurality of items stored in the memory unit and that are arranged in correspondence with locations within a prescribed range from the real-world position indicated by the position information.

According to one aspect of the present disclosure, there is provided a method comprising: a communication unit receiving, from a terminal device, position information indicating a position of the terminal device in the real world, the terminal device being held by a user, and a first application being executed in the terminal device; a memory unit storing a plurality of items stored in correspondence with prescribed locations in the real world; and a control unit assigning to the user a privilege usable in a second application different from the first application, on the basis of one or more items that are selected by the user from the plurality of items stored in the memory unit and that are arranged in correspondence with locations within a prescribed range from the real-world position indicated by the position information.

According to various embodiments of the present disclosure, users are provided with modes for assigning newer privileges.

The above effects are only illustrative for convenience of description and are not limiting. Any and all effects stated in the present disclosure or effects evident to a person skilled in the art are possible in addition to the abovementioned effect or instead of the abovementioned effect.

BRIEF DESCRIPTION OF THE DRAWINGS

FIG. 6 is a diagram conceptually illustrating item acquisition cost information stored in the server device 100 according to the first embodiment of the present disclosure;

FIG. 7 is a diagram conceptually illustrating user information of a first application stored in the server device 100 according to the first embodiment of the present disclosure;

FIG. 8 is a diagram conceptually illustrating user information of a second application stored in the server device 100 according to the first embodiment of the present disclosure;

DETAILED DESCRIPTION

Figure 1:
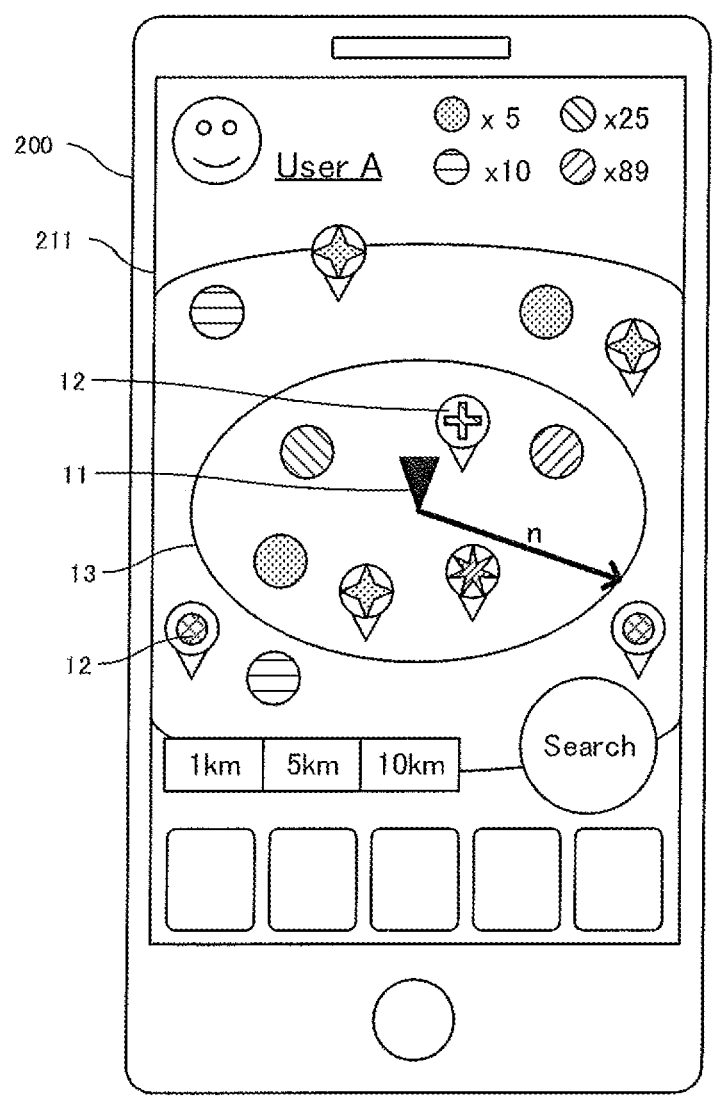
FIG. 1 is a diagram for describing the system according to various embodiments of the present disclosure.

Various embodiments of the present disclosure are described referring to the annexed drawings. Identical reference symbols are assigned to common constituent elements in the drawings.

<Outline of the System According to the Present Disclosure>

A game system in which a location-based game application and a multiplayer game application are linked in operation can be cited as an example of the system according to the various embodiments of the present disclosure. Specifically, when a server device receives, from a terminal device, position information related to a position (for example, present location) in the real world of the terminal device, the server device transmits, to the terminal device, information of an item within a prescribed range from the position of the terminal device, among one or more items stored in correspondence with prescribed locations (for example, stations, city halls, or other landmarks) in the real world, on the basis of the position information. The terminal device displays the position on a display unit on the basis of the received item information, and accepts an acquisition operation by the user. Also, when the result of the acquisition operation by the user is received, the server device assigns a prescribed privilege in accordance with the acquired item.

FIG. 1 is a diagram for describing the system according to various embodiments of the present disclosure. Specifically, an example of a screen of a first application (for example, a location-based game application) displayed on the terminal device 200 by execution of the system according to the embodiments is illustrated. When the server device 100 receives position information (for example, present location) in the real world of the terminal device 200, the server device transmits, to the terminal device 200, item information arranged in correspondence with locations within a prescribed range (for example, within m km from the present location, where n<m) from the position of the terminal device 200 on the basis of the position information. The terminal device 200 displays on the display unit 211 a present-location object 11 indicating the present position of the terminal device 200, an item object 12 indicating the item transmitted from the server device, a range object 13 indicating a range (for example, within n km from the present location) of items acquirable by the selection operation of the user, and the like. Also, information of an item acquired by the user performing a selection operation (for example, a tap operation) on an item within the range object 13 is transmitted to the server device 100. When the information of the acquired item is received, the server device 100 manages information of items acquired for each user and assigns a prescribed privilege to the users when a plurality (for example, three) of the same items became available.

In the present disclosure, privileges may be in any and all forms. As one example, the privilege may one that can be used in a second application (for example, multiplayer game application) different from the first application. It can be envisaged, for example, that a stage having an admission restriction by time is temporarily opened, or the power of a user character that corresponds to the user is improved, or a virtual currency usable in a second application is assigned. Also, the privileges are not limited to the above, and coupons, points, and the like, usable in an online shopping application can be assigned as privileges.

First Embodiment

Figure 2:
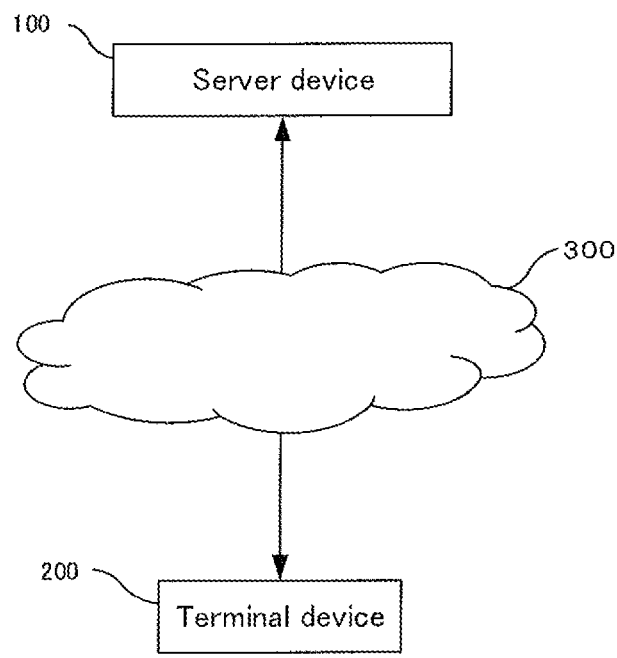
FIG. 2 is a concept diagram schematically illustrating the configuration of the system 1 according to a first embodiment of the present disclosure.

1. Configuration of System 1 According to the First Embodiment of the Present Disclosure FIG. 2 is a concept diagram schematically illustrating the configuration of a system 1 according to the first embodiment of the present disclosure. Referring to FIG. 2, the system 1 is configured with a server device 100 and a terminal device 200 connected so as to be capable of communication with the server device 100 over a network 300. Although only one terminal device 200 is depicted in the example in FIG. 2, the system 1 of course can also be executed by connecting a plurality of terminal devices 200. Also, although only one server device 100 is depicted, the constituent elements and processes of the server device 100 can also be distributed to a plurality of server devices.

In the system 1, processes related to a prescribed application are carried out by executing a program stored inside the terminal device 200. At this time, the server device 100 continually accesses the terminal device 200 in accordance with the progress of the application in the terminal device 200, and transmits the user information, game information, and parameter information required for the progress of the application.

2. Server Device 100

Figure 3:
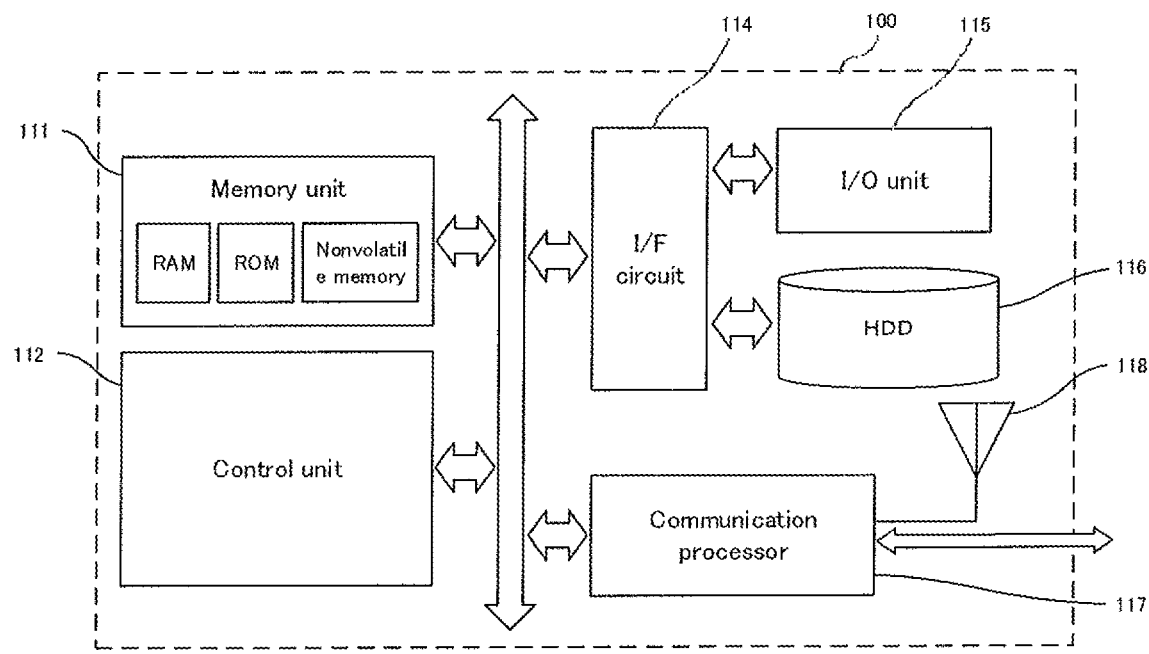
FIG. 3 is a block diagram illustrating an example of the configuration of the server device 100 according to the first embodiment of the present disclosure.

FIG. 3 is a block diagram illustrating an example of the configuration of the server device 100 according to the first embodiment of the present disclosure. The server device 100 is not required to be equipped with all of the constituent elements illustrated in FIG. 3. A configuration omitting a portion can be adopted or other constituent elements can be added.

According to FIG. 3, the server device 100 includes: a memory unit 111 including a RAM, ROM, nonvolatile memory, and the like; a control unit 112 configured with a CPU or the like; an I/F circuit 114 for connecting an I/O unit 115 and an HDD 116; and a communication unit comprising a communication processor 117 and an antenna 118. Also, these constituent elements are electrically connected to each other by way of control lines and data lines.

The memory unit 111 includes a RAM, ROM, nonvolatile memory, and the like. Also, the memory unit 111 stores: various programs for executing the system 1 in the server device 100 (for example, a program for item extraction, a program for privilege assignment, and a second application program); systems capable of executing the programs; or the like. Such programs and systems are loaded and executed by the control unit 112. Also, the memory unit (particularly the RAM) is temporarily used for executing writing and reading of data while the above programs are executed by the control unit 112.

The control unit 112 is configured with a CPU (microcomputer, or personal computer), and controls the other connected constituent elements on the basis of the various programs stored in the memory unit 111. For example, the control unit 112 refers to item information stored in the memory unit 111, extracts items within a prescribed range from the present location of the terminal device 200, and controls execution of programs for determining privileges assigned to the user on the basis of the items acquired in accordance with selection operations from the user. Also, the control unit 112 controls the communication unit so that a variety of information is transmitted and received to and from a plurality of terminal devices that include the terminal device 200. Also, the control unit 112 controls the memory unit 111 or HDD 116 in order to read or update the user information or the like in the memory unit 111 or HDD 116. The control unit 112 may be configured with a single CPU, and may also be configured with a plurality of CPUs.

The HDD 116 exchanges a variety of information with other constituent elements by way of the I/F circuit 114. The HDD 116 stores the item arrangement information, item acquisition cost information, user information of the first application, user information of the second application, and other information required for the applications executed in the terminal device, and the information is continually read out in accordance with instructions from the control unit 112.

In the present embodiment, the HDD 116 and the memory unit that includes a RAM, ROM, nonvolatile memory, and the like are depicted as being separate from each other, but the memory unit can also be configured including the HDD 116.

The communication processor 117 subjects information to modulation, demodulation, and other types of processes in order to transmit and receive the information to and from each terminal device or another server device (not shown) by way of the antenna 118.

The communication processor 117 performs processing based on a broadband wireless communication protocol such as one represented by W-CDMA (Wideband-Code Division Multiple Access) protocol, or processes based on a narrow-band wireless communication protocol such as Bluetooth® or wireless LAN such as one represented by IEEE 802.11. The communication processor 117 is connected to the antenna 118 and is connected so as to be capable of wireless communication with the outside, but the communication is not necessarily wireless communication, and a connection by way of wire cable so as to allow communication with the outside is also possible. Also, the communication processor 117 may form a communication unit together with the antenna 118, depending on the case.

3. Terminal Device 200

Figures 4, 5:
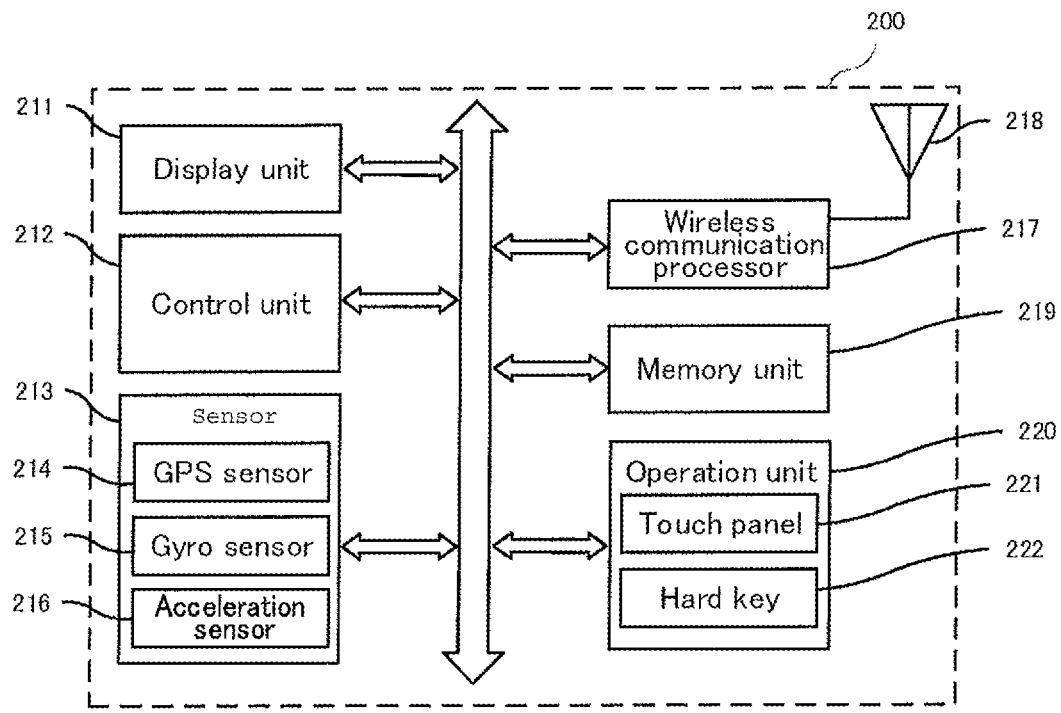
FIG. 4 is a block diagram illustrating an example of the configuration of the terminal device 200 according to the first embodiment of the present disclosure.
FIG. 5 is a diagram conceptually illustrating item arrangement information stored in the server device 100 according to the first embodiment of the present disclosure.

FIG. 4 is a block diagram illustrating an example of the configuration of the terminal device 200 according to the first embodiment of the present disclosure. The terminal device 200 is not required to be equipped with all of the constituent elements illustrated in FIG. 4. A configuration omitting a portion can be adopted or other constituent elements can be added.

A portable terminal device capable of wireless communication, represented by a smartphone, can be cited as one example of the terminal device 200. In addition, the present invention can be applied favorably to portable game devices, feature phones, mobile data terminals, PDAs, laptop computers, and the like, provided that the device is portable.

Also, even a terminal device such as a desktop computer that is inconvenient for carrying around can be used as the terminal device 200.

According to FIG. 4, the terminal device 200 includes: a display unit 211; a control unit 212; a sensor 213 that includes a GPS sensor 214, a gyro sensor 215, and an acceleration sensor 216; a communication unit that includes a wireless communication processor 217 and an antenna 218; a memory unit 219 that includes a RAM, ROM, nonvolatile memory (and HDD, depending on the case), and the like; and an operation unit 220 configured with a touch panel 221 and a hard key 222. Also, these constituent elements are electrically connected to each other by way of control lines and data lines.

The display unit 211 reads out image information stored in the memory unit 219 and performs various displays in accordance with instructions of the control unit 212. The display unit 211 is configured, for example, with a liquid crystal display.

The operation unit 220 is configured with a touch panel 221, a hard key 222, or the like, and receives input of various instructions from the user. The touch panel 221 is arranged so as to cover the display unit 211, and outputs, to the control unit 212, information of positional coordinates that corresponds to the image data displayed on the display unit 211. The touch panel method can use a resistance film method, electrostatic capacitance coupling method, ultrasonic surface elastic wave method, or other well-known method. In the present embodiment, the touch panel 221 detects a swipe operation or a tap operation that corresponds to each item displayed on a display unit 211 based on an indicator.

The control unit 212 is configured with a CPU (microcomputer), and controls the other connected constituent elements on the basis of various programs stored in the memory unit 219. Specifically, the control unit 212 reads out from the memory unit 219 programs for executing a first application and a second application. Also, the control unit 212 generates various kinds of operation information on the basis of output from the touch panel 221. The control unit 212 may be configured with a single CPU, and may also be configured with a plurality of CPUs. Also, a GPU specialized for image processing may be provided separately.

The memory unit 219 is configured with a ROM, RAM, nonvolatile memory, and the like. The ROM stores programs for executing the first application and the second application. The RAM is a memory used for writing and reading of data while various commands generated by execution of the programs stored in the ROM are processed by the control unit 212. The nonvolatile memory is a memory with which writing and reading of data are executed by execution of the programs, and the data written therein is held even after execution of the programs has ended.

The wireless communication processor 217 subjects information to modulation, demodulation, or other types of processes in order to transmit and receive the information to and from the remotely set up server device 100 or other terminal devices by way of the connected antenna 218. For example, the wireless communication processor 217 performs processing in order to receive from the server device 100 programs for executing the first application and the second application, user information used in the applications, and the like, in accordance with the progress of the applications. Also, the wireless communication processor performs processing in order to transmit to the server device 100 results of processing based on execution of the applications.

The wireless communication processor 217 performs processing on the basis of a broadband wireless communication protocol as represented by W-CDMA (Wideband-Code Division Multiple Access), but processing may be performed on the basis of a protocol related to narrowband wireless communication such as Bluetooth® or wireless LAN such as one represented by IEEE 802.11.

A communication unit is configured with the wireless communication processor 217 and the antenna 218. Wired communication can also be used instead of, or in addition to, wireless communication. In this case, a communication processor for wired communication may be provided instead of, or in addition to, the wireless communication processor 217.

4. Information Stored in the HDD 116 of the Server Device 100

FIG. 5 is a diagram conceptually illustrating item arrangement information stored in the server device 100 according to the first embodiment of the present disclosure. The server device 100 stores the item arrangement information in the HDD 116 (and/or the memory unit 111).

Specifically, class information, position information, and period information are stored in correspondence with each item ID in the server device 100. In the present embodiment, a privilege indicating opening of a stage executable by the second application is assigned to the user by acquiring a plurality of items of the same class, and the class information is information for specifying the stage to be opened. Also, in the present embodiment, the item is arranged in correspondence with a prescribed location in the real world, and the position information is information indicating the location in the real world to which each item is arranged in correspondence. Examples include information of latitude and longitude, or information indicating a specific landmark (station, city hall, or the like) in the real world. Also, in the present embodiment, one or more items are acquired by the selection operation of the user after the items are displayed on the display unit 211 of the terminal device 200, and the period information is information indicating a period in which the user can make the selection operation. For example, item C is available for a selection operation by the user between 12:00 AM to 9:30 AM, but the item is not displayed on the display unit 211 to be selectable by the user before and after that period. The position information does not necessarily have to be always fixed, and the position information can be changed randomly or optionally after a prescribed time has passed.

FIG. 6 is a diagram conceptually illustrating item acquisition cost information stored in the server device 100 according to the first embodiment of the present disclosure. The server device 100 stores the item acquisition cost information in the HDD 116 (and/or the memory unit 111).

Specifically, the server device 100 stores acquisition cost information, privilege content information, and time limit information in correspondence with a privilege ID for specifying the assignable privilege. In the present embodiment, a privilege indicating opening of a stage executable by the second application is assigned to the user by acquiring one or a plurality of items of the same class, and the acquisition cost information indicates the number of items required to assign the privilege. For example, the user must acquire three items of item class 1 in order to assign privilege A. Also, the privilege content information indicates the content of the assigned privilege. For example, as described later, stages executed by the second application include stages that are executable only in a predetermined prescribed period, and privilege A is the right that places stage A, executable by the second application, into a state such that the user can execute that stage. A fixed time limit can also be provided for privileges usable by the second application, as with privileges B, C, and the like. For example, privilege B indicates that the user can execute stage B within 1 hour after assignment of the privilege. The time limit information indicates the time limit for acquisition of the item which must be acquired for assignment of the privilege. For example, for privilege B to be assigned, the time limit information indicates that the number of items indicated by the acquisition cost must be acquired within Monday.

FIG. 7 is a diagram conceptually illustrating user information of the first application stored in the server device 100 according to the first embodiment of the present disclosure. The server device 100 stores the user information of the first application in the HDD 116 (and/or the memory unit 111).

Specifically, the server device 100 stores user name information, acquired item class information, position information, and privilege information in correspondence with a user ID of the first application. The user name information is information indicating a nickname of the user who executes the first application when the application is executed in the terminal device 200. The acquired item class information indicates the number of items acquired up to now for each item class in association with the execution of the first application. For example, the information indicates that user I has so far acquired one item of item class 1, two items of item class 2, five items of item class a, or the like. The position information is information indicating the position (for example, present location) in the real world of the terminal device 200 (for example, coordinates information of the present location) transmitted from the terminal device 200 held by the user. The privilege information is information indicating the privileges assigned to the user up to now. For example, privilege A has been assigned up to now to user I. The number of items stored in the acquired item class is counted again from zero (0) when a privilege is assigned once.

FIG. 8 is a diagram conceptually illustrating user information of the second application stored in the server device 100 according to the first embodiment of the present disclosure. The server device 100 stores the user information of the second application in the HDD 116 (and/or the memory unit 111).

Specifically, the server device 100 stores user name information, rank information, game data information, and privilege notice information in correspondence with a user ID of the second application. The user name information is information indicating a nickname of the user who executes the second application when the application is executed in the terminal device 200. Rank information is information expressing the proficiency of the user with respect to the game executed by the second application, and is information that varies in accordance with the number of stages each user cleared in the game, the number of times each user was matched with an enemy character, or the like. Examples of game data information include information of stages the user cleared, information of ally characters for matching with enemy characters on each stage (offensive power, defensive power, life power, and the like), information of stages having become executable by using assigned privileges, and the like, in the game executed by the second application. Privilege notice information is information related to a notice (message) for reporting to the user that a privilege assigned by execution of the first application has been brought to a state executable by the second application. For example, privilege notice information A is stored for user I, and a message stating "privilege A is usable" is displayed on the screen during execution of the second application on the basis of that information.

Although not specifically illustrated, the server device 100 stores stage information of the game executed by the second application in addition to the information given in FIG. 5 to FIG. 8. Specifically, as the second application in the present embodiment, there is executed a game application in which one or more stages are included, a specific mission (battle with an enemy character) is assigned for each stage, the stage is cleared by completing the assigned mission, and advancement to the next stage becomes possible. Accordingly, a stage ID for specifying each stage, mission information (information of enemy characters on stage, information of strength of enemy characters, and the like) given no the stage, and incentive information (for example, upgrading rank in victory) are stored in correspondence with each stage. Furthermore, for some of all stages, time information of when the stage is executable is stored in correspondence with the stage ID. That is, as time information, for a stage with which "Monday" is stored in correspondence, each user becomes able to execute that stage only on Monday.

Also, in the present embodiment, the first application (for example, location-based game application) and the second application (for example, multiplayer game application) exist as separate applications executed by different programs installed in the terminal device 200. However, when information indicating that the user is allowed a linked operation of both applications is received from the terminal device 200, the server device 100 shares the user information of the first application and the user information of the second application. Specifically, the user name information and rank information of the second application are used in place of the user name information of the first application during execution of the first application.

5. Processing Sequence Between Server Device 100 and Terminal Device 200

Figure 9:
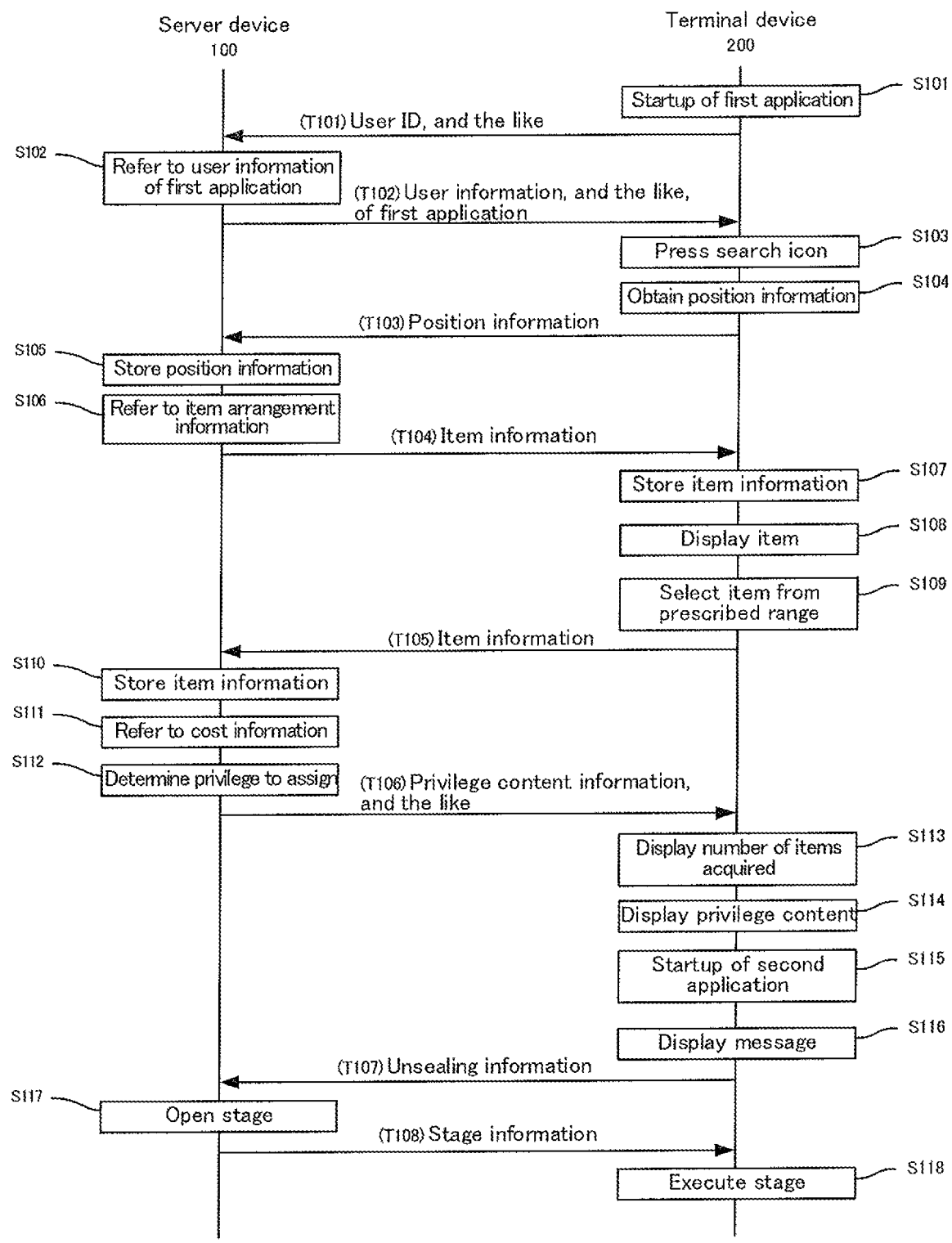
FIG. 9 is a diagram illustrating the processing sequence between the server device 100 and the terminal device 200 according to the first embodiment of the present disclosure.

FIG. 9 is a diagram illustrating the processing sequence between the server device 100 and the terminal device 200 according to the first embodiment of the present disclosure. In the present embodiment, processing of the first application and the second application as a linked operation can be carried out as described above, and in FIG. 9 to FIG. 17, the description is given with the premise that the processing of a linked operation is being carried out. Accordingly, the user information of the second application is used for the user name information and the rank information of the user information of the first application.

According to FIG. 9, when startup of the first application is instructed in the terminal device 200 (S101), the terminal device 200 transmits to the server device 100 a transmission request (T101) with the user IDs arranged in correspondence with each user, and the user information of the first application arranged in correspondence with the user IDs. The control unit 112 of the server device 100, having received that request, refers to the user information of the first application illustrated in FIG. 7, and transmits to the terminal device 200 various kinds of information (T102) required in execution of the first application, including the user name information and acquired item information arranged in correspondence with the user IDs.

Also, it is detected on the terminal device 200 whether the user has pressed the search icon displayed on the display unit 211 after the first application was executed. The search icon is an icon for instructing to obtain, from the server device 100, item information arranged in correspondence with locations around the real-world present position of the terminal device 200 held by the user. When the icon is pressed (S103), the terminal device 200 obtains position information (for example, coordinates information) specifying the present location of the terminal device 200 in the real world, for example, on the basis of the GPS sensor 214 (S104). The information (T103) is transmitted to the server device 100.

When the position information is received, the server device 100 stores the position information in correspondence with the user ID as the user information of the first application illustrated in FIG. 7 (S105). After that, the server device 100 refers to the item arrangement information illustrated in FIG. 5 and extracts one or more items arranged in correspondence with locations within a prescribed range (for example, m km) from locations specified by the received position information (S106). Also, the server device 100 transmits the extracted item information (T104) to the terminal device 200.

Figure 10:
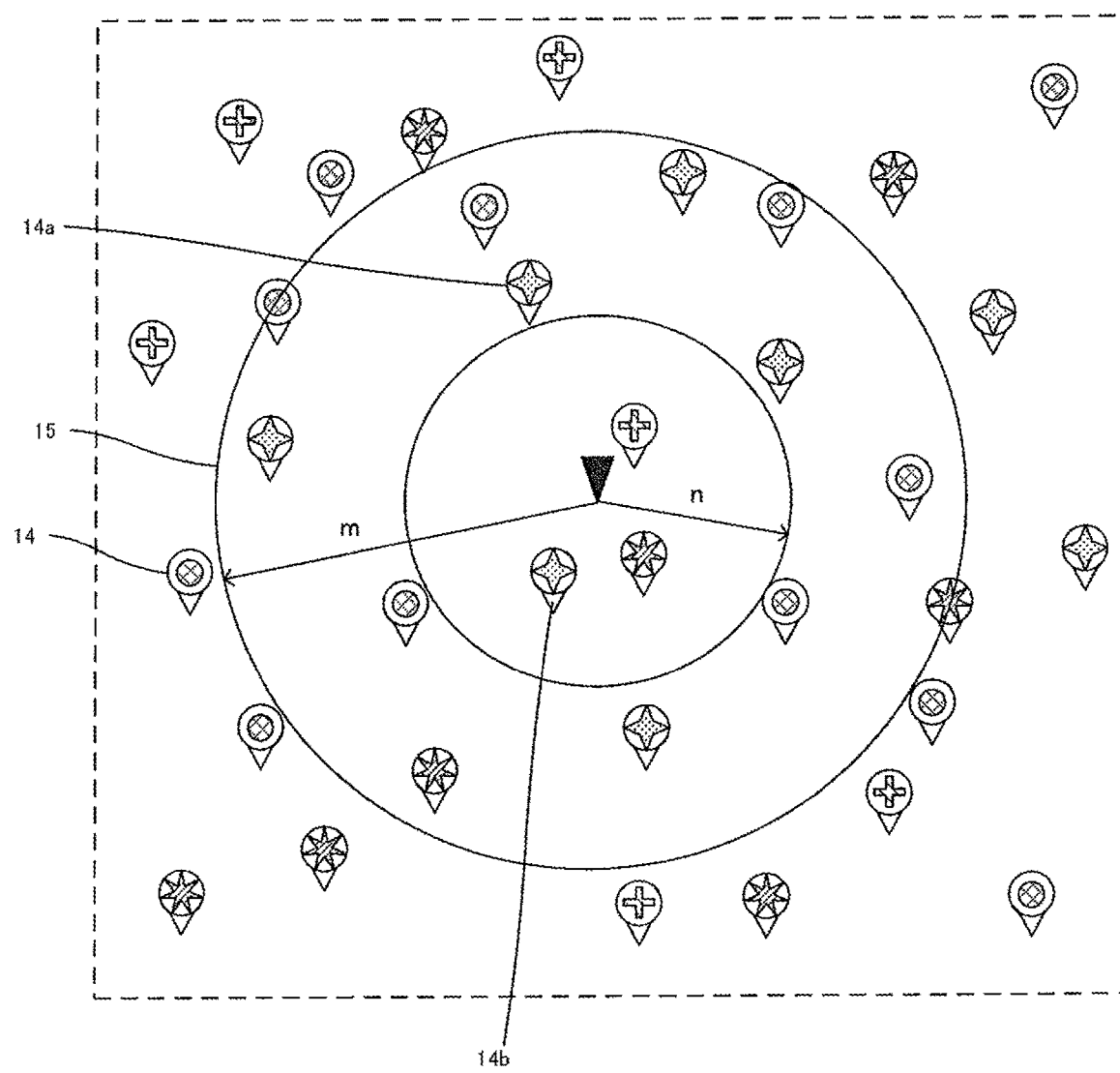
FIG. 10 is a diagram conceptually illustrating the positional relationship of items extracted by the server device 100.

Here, FIG. 10 is a diagram conceptually illustrating the positional relationship of items extracted by the server device 100. According to FIG. 10, each item is arranged in correspondence with a prescribed location in the real world in a game space arranged in correspondence with the real world. Of these, the item objects 14a and 14b within a prescribed distance (m km) (within the circle indicated by symbol 15) from the position of the terminal device in the real world are items extracted in the above S106.

Next, when the item information is received, the terminal device 200 stores the received item information in the memory unit 219 (S107). Also, the terminal device 200 displays, on the display unit 211 and on the basis of the position information included in the item information, an object (present-location object 11) indicating the present position of the terminal device 200 in the real world, as well as objects (item objects 14a and 14b) indicating the arrangement positions of those items, on the screen during execution of the first application (S108).

Figure 11:
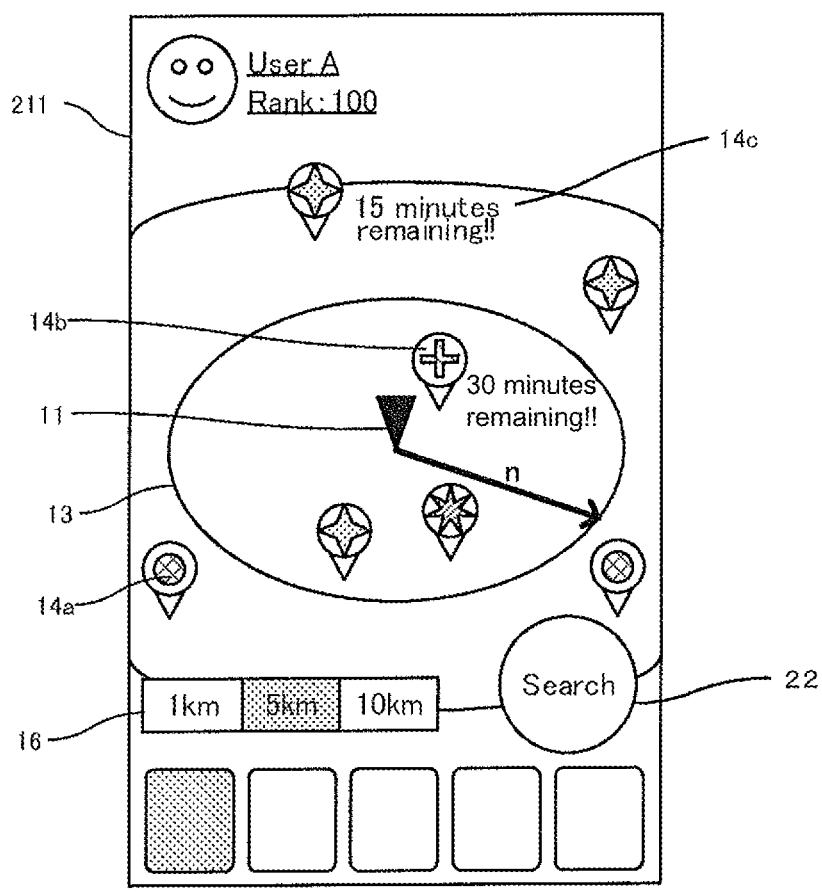
FIG. 11 is a diagram illustrating an example of a screen displayed on the display unit 211 of the terminal device 200.

Here, FIG. 11 is a diagram illustrating an example of a screen displayed on the display unit 211 of the terminal device 200. According to FIG. 11, the positional relationship between the position of the terminal device 200 in the real world and a prescribed location specified by the received item information is displayed in a graspable manner on the display unit 211 of the terminal device 200. Specifically, a map of the real world is displayed on the display unit 211 centered on the present position of the terminal device 200 (present-location object 11) in the real world. Also, overlaid on the map, the item objects 14a and 14b indicating the items arranged in correspondence with the positions specified on the basis of the received item information are displayed, as is a range object 13 that indicates a range of a prescribed distance from the present location. Also displayed is a range object 13 indicating a range (within n km from the present position of the terminal device 200 in the real world) of items acquirable by the selection operation of the user.

As illustrated in FIG. 5, period information of a period in which an item is acquirable is stored for each item. When that period information is stored in correspondence with an item ID, each item object 14a and 14b is displayed together with the time limit information 14c thereof. Also, although the present map display displays a range having a 5 km radius, the displayed range can be suitably enlarged or reduced using a range-specifying icon 16.

Again in FIG. 9, only an item (item object 14b in FIG. 10 and FIG. 11) within a prescribed range (for example, n km, where n<m) is acquirable by the selection operation of the user from the items displayed in S108. At that time, the terminal device 200 receives a tap operation from the user on the touch panel 221 (S109), and transmits, to the server device 100, information (item ID: T105) specifying the item arranged in the position of the tapped coordinates.

The server device 100 stores information specifying the received item, in correspondence with the user ID for which the first application is being executed (S110). Specifically, as illustrated in FIG. 7, the number of item acquired up to now is stored by class information of each item arranged in correspondence with the information specifying the received item (S110). Next, the server device 100 refers to the item acquisition cost information illustrated in FIG. 6 (S111). Also, it is determined as to whether the number of items acquired has exceeded the number prescribed by the acquisition cost information. When that number of items has been exceeded, the server device 100 refers to the privilege content arranged in correspondence with the privilege IDs of the item acquisition cost information, determines the privilege to assign to the user (S112), and transmits that privilege information (privilege content information; T106) to the terminal device 200. Also, at this time, the server device 100 transmits to the terminal device 200 number-of-items information of the items acquired by the user up to now (FIG. 7).

The terminal device 200 displays on the display unit 211 the received number-of-items information and privilege content information, as suitably selected by the user (S113 and S114).

Figure 12:
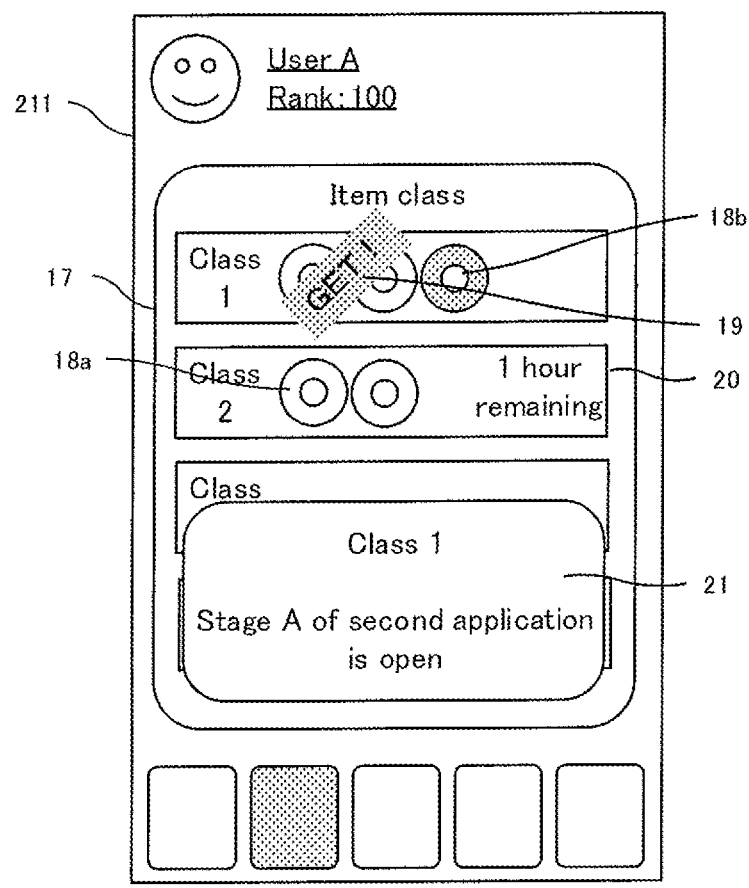
FIG. 12 is a diagram illustrating an example of a screen displayed on the display unit 211 of the terminal device 200.

FIG. 12 is a diagram illustrating an example of a screen displayed on the display unit 211 of the terminal device 200. Specifically, FIG. 12 illustrates an example of an acquired items screen 17 displayed when number-of-items information and privilege content information were received from the server device 100. According to FIG. 12, an acquired item object 18a indicating the number of items already acquired, and an acquired item object 18b indicating an item acquired this time, are displayed for each class on the basis of the received number-of-items information. Also, an assigned privilege object 19 indicating that the privilege is already assigned, and content information 21 of the privilege, are displayed on the basis of the privilege content information.

As illustrated in FIG. 6, a time limit for acquisition of the item, in which the item must be acquired for assignment of the privilege, is set for each privilege. Time information indicating the remaining time for privilege assignment is displayed on the display unit 211 on the basis of that setting.

Returning again to FIG. 9, when the second application is started up on the terminal device 200 by the user having referred to the privilege content information 21 illustrated in FIG. 12 (S115), it is displayed on the display unit 211 of the terminal device 200 that a message has been received for reporting to the user that a privilege assigned by execution of the first application has been brought to a state executable by the second application. According to the display, the user unseals the message and the message is displayed (S116), whereupon information indicating that the message has been unsealed (T107) is transmitted to the server device 100.

The server device 100 receives the information that the message has been unsealed, and opens the stage that corresponds to the privilege determined in S112 to a state accessible to the user. Specifically, information of the stage that corresponds to the privilege is written as accessible stage information in the game data information of the user (S117). Also, the server device 100 transmits to the terminal device 200 the stage information of the stage opened to an accessible state. At this time, as illustrated in FIG. 6, when a limitation is added to the time during which the stage is open, such as adding "open stage B for 1 hour" (privilege B) to the privilege, that limitation information also is transmitted together.

On the basis of the received stage information, the display on the display unit 211 of the terminal device 200 indicates a state in which the stage is executable, and the stage is executed in accordance with the user's desire (S118).

When the second application is started in S115, various kinds of requests and the user ID for specifying the user who executes the second application are transmitted from the terminal device 200 to the server device 100, and various kinds of information illustrated in FIG. 8 are transmitted from the server device 100 to the terminal device 200, but these steps are omitted.

6. Processing Flow of the First Application in the Server Device 100

Figure 13:
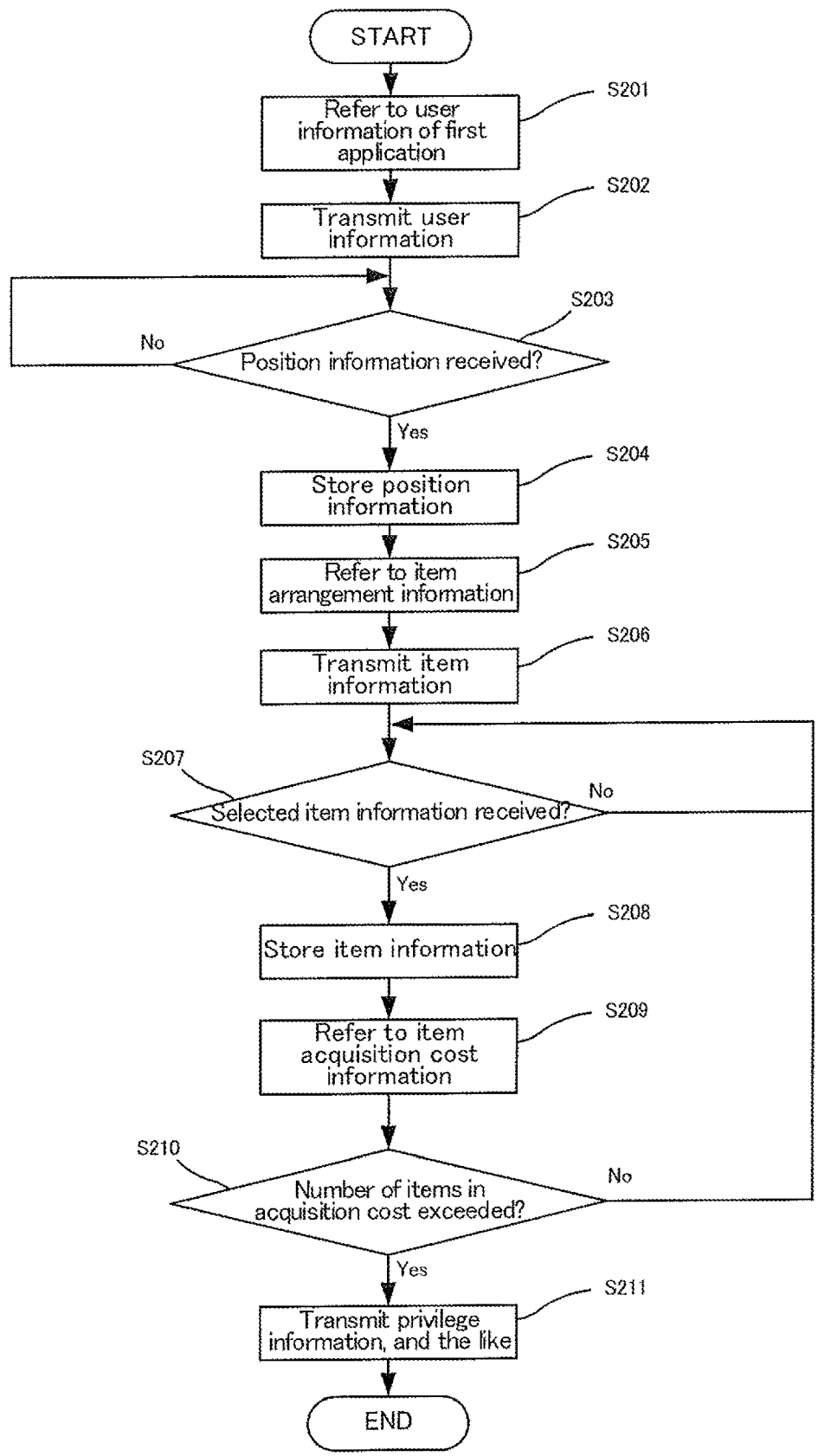
FIG. 13 is a diagram illustrating the processing flow executed in the server device 100.

FIG. 13 is a diagram illustrating the processing flow executed in the server device 100. Specifically, FIG. 13 is a diagram illustrating the processing flow executed in the server device 100 when the first application is being executed in the terminal device 200.

The processing flow illustrated in FIG. 13 starts by the first application being started up in the terminal device 200 and the communication unit receiving a user ID transmitted from the terminal device 200 and receiving a transmission request for the user information of the first application arranged in correspondence with the user ID.

The control unit 112 refers to the user information of the first application illustrated in FIG. 7 on the basis of the information received by the communication unit, and specifies each piece of user information that corresponds to the received user ID (S201). The control unit 112 transmits the specified user information to the terminal device 200 by way of the communication unit (S202). Also, the control unit 112 suspends the advance of the processing flow until position information indicating the real-world position of the terminal device 200 detected by the GPS sensor 214 in association with the execution of the first application is received from the terminal device (S203).

Also, when the position information is received from the terminal device 200 (S203), the control unit 112 stores the received position information in correspondence with the user ID in the user information of the first application (FIG. 7) in the HDD 116 (204)(*1). Next, the control unit 112 refers to the item arrangement information (FIG. 5) and specifies items stored in correspondence with locations within a prescribed range (m km) from the location specified by the position information (S205). Next, the control unit 112 transmits the item information (FIG. 5) of the specified item to the terminal device 200 by way of the communication unit (S206).

Also, the control unit 112 suspends the advance of the processing flow until item information that corresponds to one or more items acquired by user selection from the transmitted items is received from the terminal device 200 (S207). When the item information that corresponds to one or more items acquired by user selection is received by the communication unit (S207), the control unit 112 performs control so that the received item information is stored in correspondence with the user ID in the acquired item class information (FIG. 7) of the user information of the first application (S208).

Next, the control unit 112 refers to the item acquisition cost information (FIG. 6) stored in the memory unit 111 or the HDD 116, and compares the number of items acquired up to the present for each privilege class and the number of items required to assign the privilege (acquisition cost information) (S209). Also, when the number of items acquired does not exceed the number of items required to assign the privilege, the control unit 212 suspends the advance of the processing until item information of items acquired by user selection is again received (S210). Meanwhile, when the number of items acquired exceeds the number of items required to assign the privilege, the control unit 212 controls the communication unit so that the privilege content information arranged in correspondence with the assigned privilege and the number-of-items information of the items acquired by the user up to the present are transmitted to the terminal device 200 (S211). Also, the control unit 112 temporarily ends the processing series until position information is received again in S203 or until item information of items acquired by user selection is received in S207.

7. Processing Flow of Second Application in Server Device 100

Figure 14:
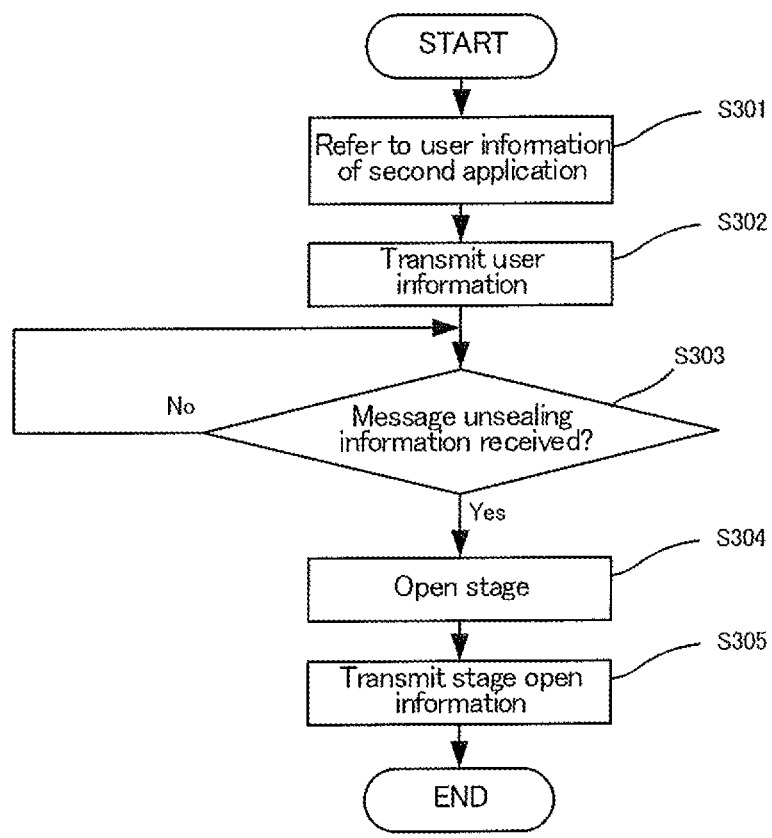
FIG. 14 is a diagram illustrating the processing flow executed in the server device 100.

FIG. 14 is a diagram illustrating the processing flow executed in the server device 100. Specifically, FIG. 14 is a diagram illustrating the processing flow executed in the server device 100 when the second application is being executed in the terminal device 200.

The processing flow illustrated in FIG. 14 starts by the second application being started up in the terminal device 200, and the communication unit receiving a user ID transmitted from the terminal device 200 and receiving a transmission request for the user information of the second application arranged in correspondence with the user ID.

The control unit 112 refers to the user information of the second application illustrated in FIG. 8 on the basis of the information received by the communication unit, and specifies the user information that corresponds to the received user ID (S301). The control unit 112 transmits the specified user information to the terminal device 200 by way of the communication unit (S302). Also, the control unit 112 suspends the advance of the processing flow until information indicating unsealing of a message that a privilege has been assigned in association with the execution of the second application is received by the communication unit from the terminal device 200 (S303).

Also, when the information indicating unsealing of a message that a privilege has been assigned is received by the communication unit, the control unit 112 refers to the item acquisition cost information illustrated in FIG. 6, and specifies privilege content information indicating the content of the assigned privilege. Also, the control unit 112 performs processing to open a specific stage included in the game application executed as the second application on the basis of the privilege content information. Specifically, the control unit 112 writes the data as an accessible stage, in correspondence with the user ID, in the user information (for example, game data information) of the second application illustrated in FIG. 8 (S304).

The control unit 112 then controls the communication unit so that the stage information of the stage opened in the accessible state is transmitted to the terminal device 200 (S305). At this time, as illustrated in FIG. 6, when a limitation is set for the time during which the stage is open, information of that limitation also is transmitted at the same time.

Also, the control unit 112 temporarily ends the processing series related to stage opening of the second application until message unsealing information is received again in S303.

8. Processing Flow of First Application in Terminal Device 200

Figure 15:
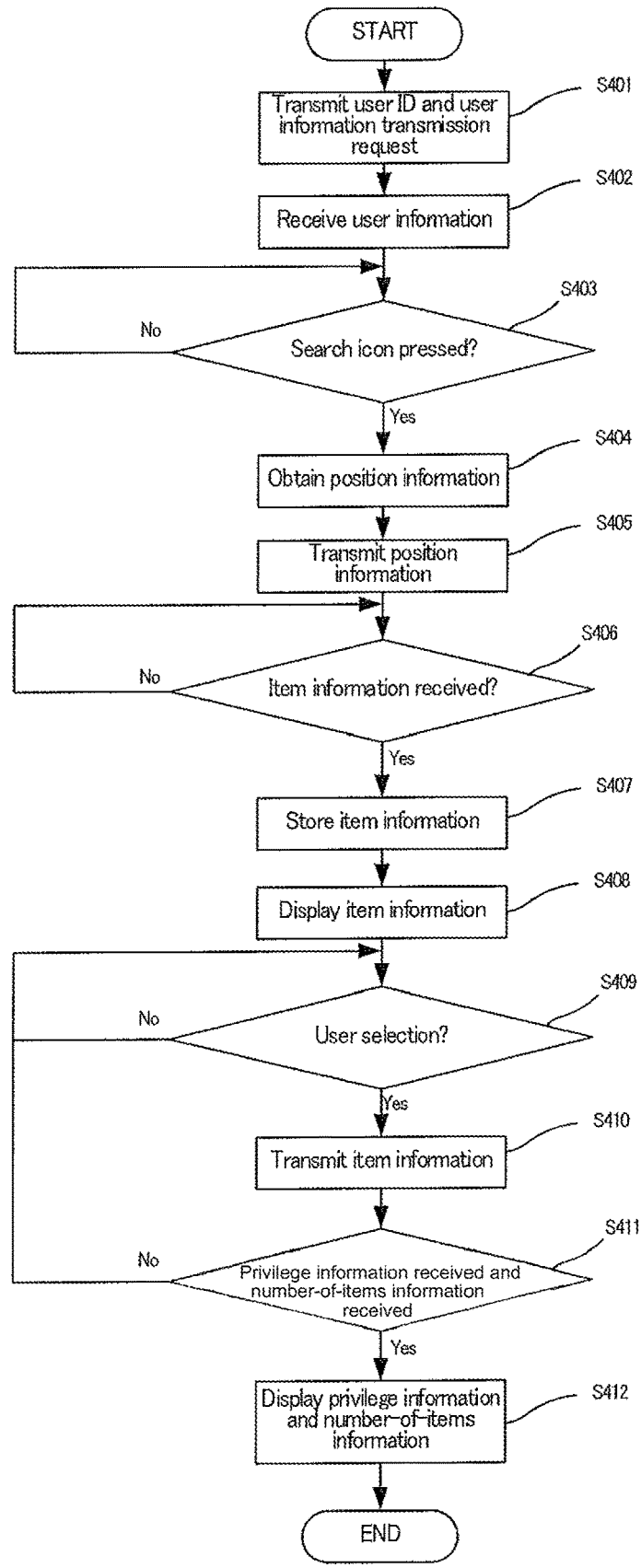
FIG. 15 is a diagram illustrating the processing flow executed in the terminal device 200.

FIG. 15 is a diagram illustrating the processing flow executed in the terminal device 200. Specifically, FIG. 15 is a diagram illustrating the processing flow executed in the terminal device 200 when the first application is being executed in the terminal device 200.

The processing flow illustrated in FIG. 15 starts by the first application being started up by user operation in the terminal device 200. The control unit 212 controls the communication unit so that the user ID and a transmission request for user information of the first application stored in correspondence with the user ID are transmitted to the server device 100 upon the startup operation (S401). Also, when the user information is received from the server device 100, the control unit 212 stores the received user information in the memory unit 219 (S402).

Also, the control unit 212 suspends the processing flow until a tap operation that corresponds to the search icon 22 displayed on the display unit 211 is detected on the touch panel 221 (S403). When the tap operation on the search icon is detected on the touch panel 221, the control unit 212 controls the GPS sensor 214 and obtains the position information (for example, coordinates information) of the present position of the terminal device 200 in the real world (S404). Next, the control unit 212 controls the communication unit so that the obtained position information is transmitted to the server device 100 (S406).

When the position information is transmitted, the control unit 212 stands by until item information of items arranged in correspondence with locations within a prescribed range (for example, m km) from the present position of the terminal device 200 specified by the position information is received from the server device (S406). When the item information is received, the control unit 212 stores the received item information in the memory unit 219 (S407).

Next, the control unit 212 displays item objects 14a and 14b that correspond to each received item on a screen displaying a map that corresponds to the real world, on the basis of the position information, class information, and period information in the stored item information (FIG. 11) (S408). At this time, only the item (the item indicated by item object 14b) within a prescribed range (for example, n km, where n<m) from the present position of the terminal device 200 is acquirable by user selection. Also, the control unit 212 suspends the advance of the processing flow until the touch panel 221 detects the tap operation of the user on the item object 14b arranged within that range (S409).

When a selection operation on one or more item objects 14b is detected, the control unit 212 controls the communication unit so that the item information of the items acquired by that selection is transmitted to the server device 100 (S410). Also, the control unit suspends the advance of the processing flow until the privilege information specified by the transmitted item information and the number-of-items information of items acquired to date are received from the server device 100 (S411).

When the privilege information and the number-of-items information are received from the server device 100, the control unit 212 controls the display unit 211 so that a display based on the received information (FIG. 12) is made (S412). Also, the control unit ends the processing series until pressing of the search icon is detected in S403 or a user selection operation is detected in S408.

In the present embodiment, pressing of the search icon 22 is detected in S403, but a limitation can be added to the pressing down of the search icon 22. For example, the embodiment can be configured so that the time when the search icon 22 was pressed is managed in the server device 100 or the terminal device 200, and repeated pressing is not allowed for a fixed time (for example, 1 hour). Also, a number of times the search icon 22 can be pressed per prescribed time, a number of times the icon was already pressed during that time, and a remaining time until the count of the number of times the icon was already pressed is restarted from zero can be managed in the server device 100 or the terminal device 200, and the number of times the icon can be pressed per prescribed time can be limited. In such a case, the number of times the search icon 22 can be pressed per prescribed time, the number of times the icon was already pressed during that time, and the remaining time until the count of the number of times the icon was already pressed is restarted from zero can be displayed on the search icon 22 illustrated in FIG. 11. In this case, the processing load involved in the transmission of position information can be alleviated.

9. Processing Flow of Second Application in Terminal Device 200

Figure 16:
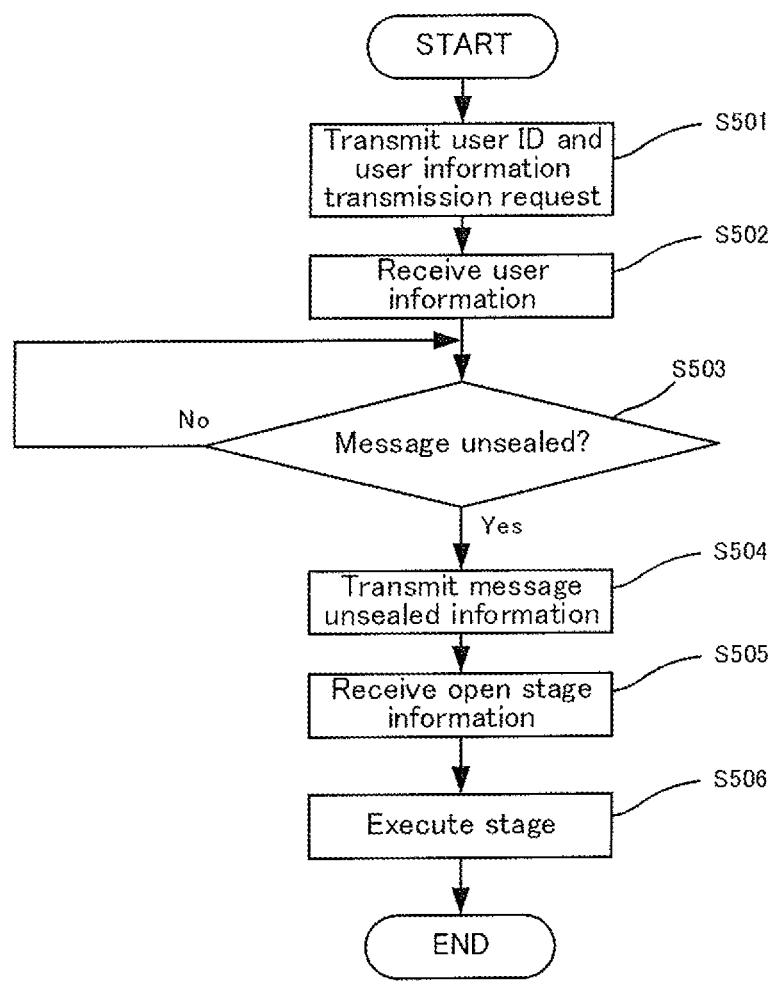
FIG. 16 is a diagram illustrating the processing flow executed in the terminal device 200.

FIG. 16 is a diagram illustrating the processing flow executed in the terminal device 200. Specifically, FIG. 16 is a diagram illustrating the processing flow executed in the terminal device 200 when the second application is being executed in the terminal device 200.

The processing flow illustrated in FIG. 16 starts by the second application being started up in the terminal device 200. The control unit 212 controls the communication unit so that the user ID and a transmission request for user information of the second application stored in correspondence with the user ID are transmitted to the server device 100 upon the startup operation (S501). Also, when the user information is received from the server device 100, the control unit 212 stores the received user information in the memory unit 219 (S502).

At this time, when open stage information is included in the received user information, the control unit 212 controls the display unit 211 so that a display is made to the effect that a message for reporting to the user that the stage specified by the stage information has become in a state executable by the second application was received. Also, when it is detected that the above message was unsealed (S503), the control unit 212 controls the communication unit so that a statement to that effect is transmitted to the server device 100 (S504).

Figure 17:
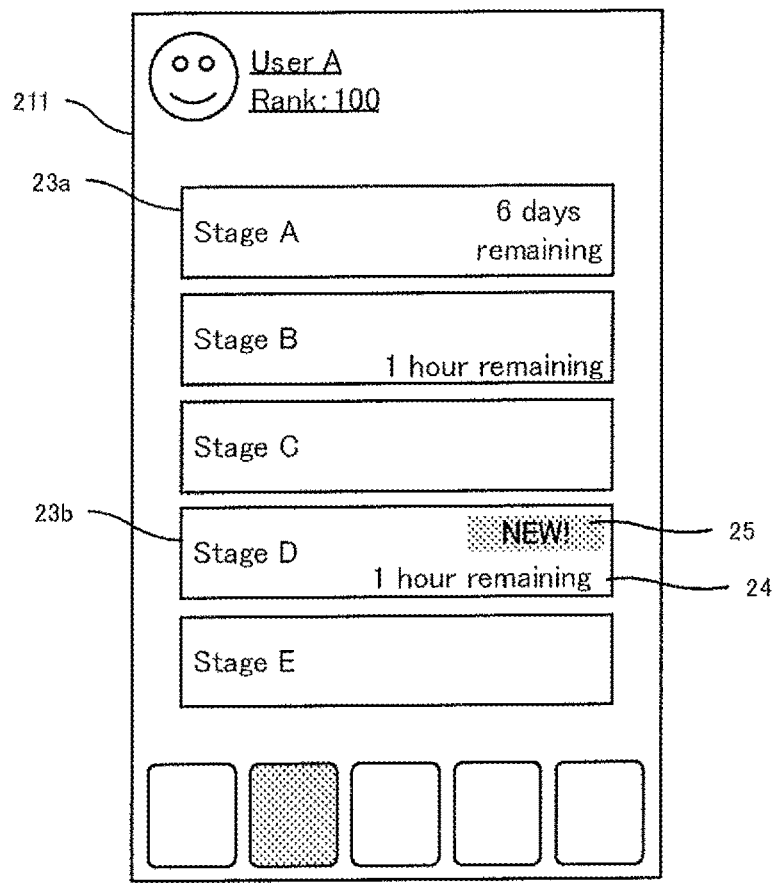
FIG. 17 is a diagram illustrating an example of a screen displayed on the display unit 211 of the terminal device 200.

When the stage information indicating the stage freed in an accessible state is received from the server device 100, the control unit 212 displays the stage to be selectable on the display unit 211. FIG. 17 is a diagram illustrating an example of a screen displayed on the display unit 211 of the terminal device 200. Specifically, the example is of a screen on which the stage freed in an accessible state is displayed to be selectable by the user on the display unit 211. According to FIG. 17, in addition to a stage icon 23*a* that corresponds to an already accessible stage, a stage (for example, stage D) newly freed in an accessible state as a privilege at this time is displayed on the stage selection screen, as are the stage icon 23*b* thereof, a display 25 indicating the presence of a newly freed stage, and time limit information 24 in which the stage is accessible.

Returning again to FIG. 16, when selection of a newly freed stage by the user is detected on the stage selection screen illustrated in FIG. 17, the control unit 212 controls so that the battle game on that stage is executed (S506). Also, although not specifically illustrated, the control unit 212 performs each kind of processing that corresponds to the results of the battle game, and ends the processing flow.

In the present embodiment, the first application and the second application can be executed separately as respectively independent applications. In this case, the privileges are not limited to privileges usable in the second application, and points, or the like, usable when executing the first application can also be assigned. Meanwhile, the embodiment can also be arranged so that privileges usable in the second application are acquired only when an instruction operation to effect linked operation of the first application and the second application by the user is detected in the terminal device 200 during execution of either application.

Figure 18:
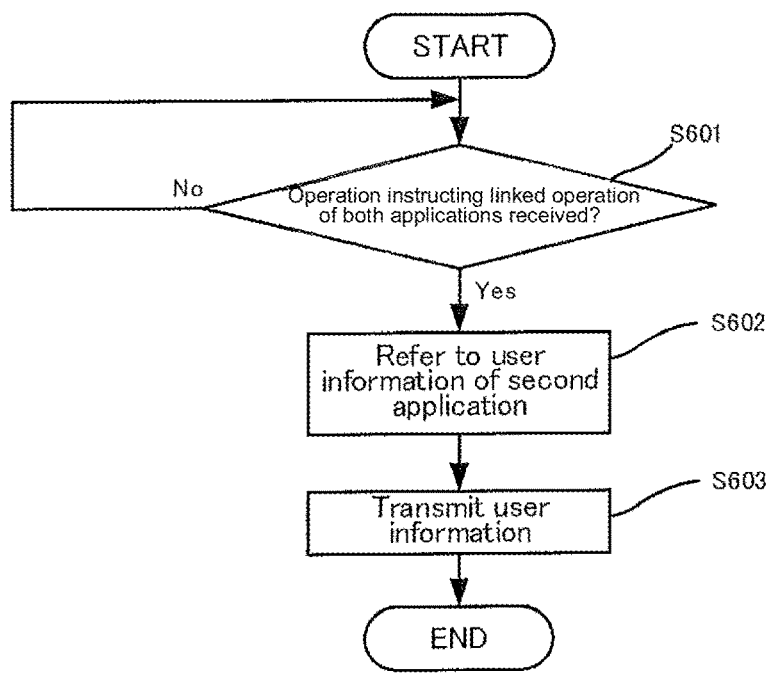
FIG. 18 is a diagram illustrating the processing flow executed in the server device 100.

FIG. 18 is a diagram illustrating the processing flow executed in the server device 100. Specifically, FIG. 18 illustrates an example in which an instruction operation for linked operation with the second application is detected when the first application is being executed. According to FIG. 18, the control unit 112 suspends the advance of the processing flow until the instruction operation for linked operation of the second application is received from the terminal device 200 (S601). Also, when the instruction operation is received from the terminal device 200, the control unit 112 controls so that reference is made to the user information of the second application (FIG. 8) in subsequent processing in the first application (S602). Also, the control unit 112 transmits to the terminal device 200, as user information usable in the first application, the user name information and the rank information of the user information of the second application (S603), and ends the processing flow.

In the present embodiment, acquisition of an item for assigning a privilege usable in the second application may be enabled only when an instruction operation to the effect that linked operation between the first application and the second application is performed is received. In that case, the embodiment may also be arranged so that points (for example, virtual currency points) usable in the first application are assigned when linked operation is not being performed.

Figures 19, 20:
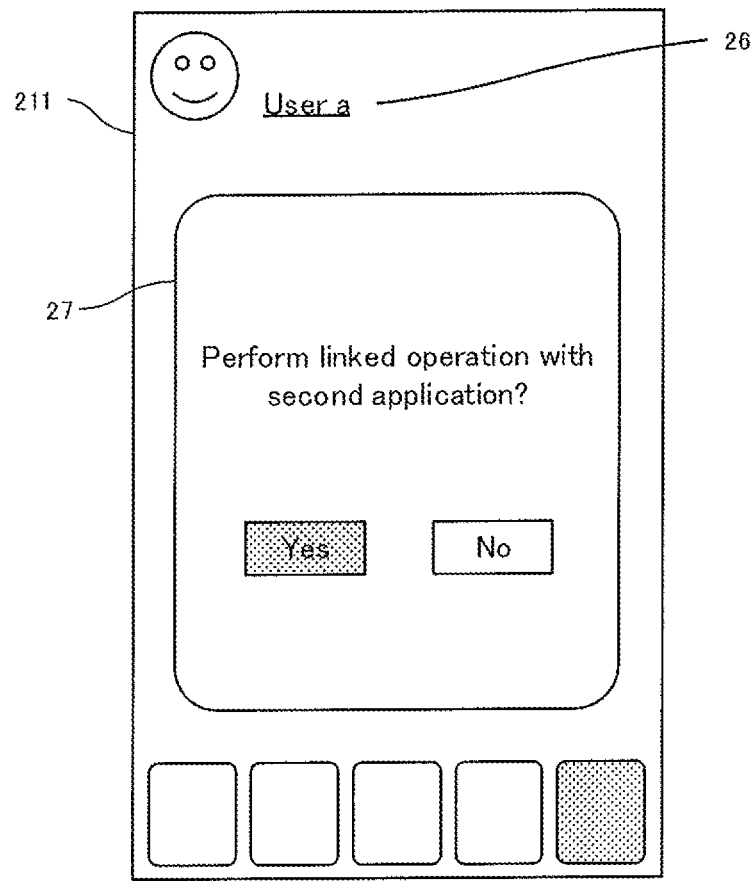
FIG. 19 is a diagram illustrating an example of a screen displayed on the display unit 211 of the terminal device 200.
FIG. 20 is a diagram conceptually illustrating item arrangement information stored in the terminal device 200 according to a second embodiment of the present disclosure.

FIG. 19 is a diagram illustrating an example of a screen displayed on the display unit 211 of the terminal device 200. Specifically, the example is of a screen when instructing to select linked operation with the second application in the first application in the terminal device 200. In this case, the user information of the first application is used because this is prior to the linked operation. Accordingly, the user information (user a) obtained from the first application is displayed as the user name information 26. Also, a window 27 for having the user select whether or not to effect linked operation with the second application is displayed. When "yes" is instructed by selection by the user, the processing of a linked operation illustrated in FIG. 18 is carried out in the server device 100. As a result, for example as illustrated in FIG. 11, the user information of the second application is used as the user name application, and the rank information is also obtained and displayed.

In the present embodiment above, a newer privilege, being a privilege usable in the second application, can be provided to the user depending on the results of execution of the first application. Meanwhile, assignment of the privilege is determined in the first application, and the assigned privilege is used in the second application. Accordingly, the system according to the present embodiment can be deployed in all kinds of applications by suitably exchanging only the second application. Also, the user information of the second application is shared when the first application and the second application are linked in operation. Effective utilization of memory resources is thereby possible. Also, because the major part of the processing related to assignment and use of the applications is performed in batch in the server device 100, new privileges can be provided while the processing load on the terminal device 200 is alleviated.

Second Embodiment

In the first embodiment, only item information received from the server device 100 was displayed on the terminal device 200, but in the second embodiment, item information generated and stored in the terminal device 200 is furthermore displayed. In the present embodiment, the configuration, processing, and procedures are the same as those in the first embodiment, except for the points described below. Accordingly, detailed description of those matters is omitted.

FIG. 20 is a diagram conceptually illustrating item arrangement information stored in the terminal device 200 according to the second embodiment of the present disclosure. According to FIG. 20, class information and position information are stored in correspondence with item IDs in the memory unit 219 of the terminal device 200. In the present embodiment, the item ID is generated randomly at a timing of the user pressing the search icon, and is appended to existing item arrangement information.

Figures 21, 22:
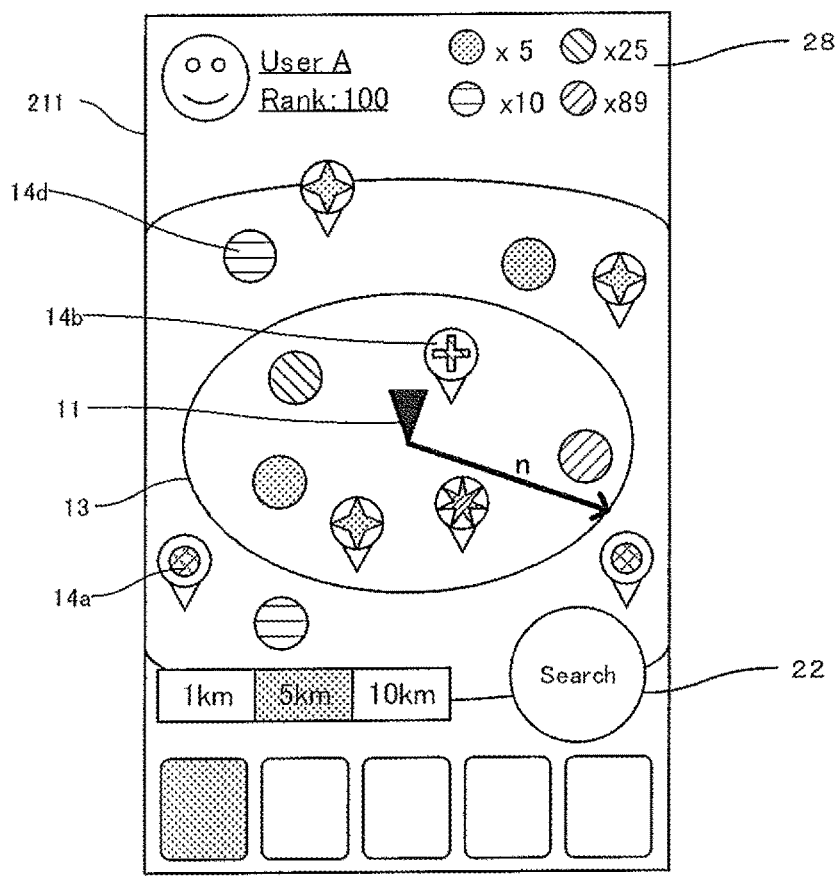
FIG. 21 is a diagram illustrating an example of a screen displayed on the display unit 211 of the terminal device 200.
FIG. 22 is a diagram conceptually illustrating item acquisition cost information stored in the server device 100 according to the second embodiment of the present disclosure.

FIG. 21 is a diagram illustrating an example of a screen displayed on the display unit 211 of the terminal device 200. According to FIG. 21, in addition to item objects 14a and 14b that correspond to item information received from the server device 100, an item object 14d that corresponds to each piece of item information stored as item arrangement information of the terminal device 200 also is displayed together. Also, of these, only the item objects 14b and 14d in positions within the range object 13 are selectable, and are acquired in accordance with a user selection operation. The acquired items are respectively stored in the user information illustrated in FIG. 7, and the number of items acquired to date is counted, in the same manner as in the first embodiment. Number-of-items information 28 of the acquired items is displayed on the display unit 211.

In the first embodiment, a selection operation of an application was performed by a tap operation, but in the present embodiment, a plurality of item objects 14d can be selected at once by a swipe operation for items stored in the item arrangement information of the terminal device 200.

FIG. 22 is a diagram conceptually illustrating item acquisition cost information stored in the server device 100 according to the second embodiment of the present disclosure. In addition to the item cost information of the first embodiment, a privilege ID that corresponds to each item stored in the item arrangement information of the terminal device 200, as well as acquisition cost information and privilege content information thereof are additionally stored. Also, the control unit 112 of the server device 100 refers to the item acquisition cost information when determining a privilege to assign.

In the present embodiment above, the item arrangement information is stored also inside the terminal device 200. Accordingly, in the present embodiment, more diverse item acquisition conditions can be set, in addition to the effects obtained in the first embodiment.

Other Embodiments

1. Position Information

Position information was obtained using a GPS sensor 214 of the terminal device 200. However, the invention is not limited to obtaining position information by the GPS sensor 214, and position information obtained from a Wi-Fi, LTE, or other wireless communication network, or information of relative position change obtained from a gyro sensor 215 or an acceleration sensor 216 can also be obtained for use. That is, any and all well-known data can be used as position information.

Also, in the above embodiments, obtainment of the position information is executed at a timing of when the search icon was pressed. However, the timing of obtainment of the position information is not limited to pressing of the search icon. For example, the position information may be obtained automatically at a timing of startup of the first application. Also, the position information may be obtained automatically at a prescribed interval (for example, every other hour).

Also, in the second embodiment, the item object 14d was randomly generated at a timing of pressing of the search icon 22, but the timing is not limited to that of pressing of the search icon 22. For example, the item object may be generated automatically at a timing of startup of the first application. Also, the item object may be generated automatically at a prescribed interval (for example, every other hour).

2. Application Information

In the above embodiments, the first application and the second application were described as respectively independent separate applications, and the assigned privilege was described as being usable in the second application. A right for the user to put the stage into an executable state was given as one example, but in addition, characters or items usable in the second application, or improvement of power value of the character can also be assigned. Also, the invention is not limited to these, and the privileges can be assigned and used within a single application, without distinguishing between first application and second application. Also, the assigned privileges are not limited to privileges usable in the second application, and the privileges may also be usable in the first application, and points, coupons, or the like used in online shopping, or the like, can also be assigned.

Also, reference was made to predetermined assignment conditions (the item acquisition cost information in FIG. 6) when assigning privileges. Different numbers for each terminal device or user executing the application according to the above embodiments can be set for the acquisition cost information in the item acquisition cost information. Also, numbers common among all terminal devices or all users, or among a plurality of terminal devices or a plurality of users (for example, among all terminal devices or all users present in a prescribed geographical range), can be set.

3. Item Selection Operation

In the above embodiments, a tap operation and a swipe operation were described in examples as item selection operations. However, the operations are not limited to these, and the operation may be another operation on the touch panel 221, and may be a selection operation using a hard key 222.

4. Terminal Device 200

In the above embodiments, a case was described in which either of the first application and the second application is executed in the terminal device 200. However, because the user information of the first application and the second application is managed in the server device 100, each application can also be executed in respectively different terminal devices.

5. Arrangement of Items

In the above embodiments, the items 14 including the items 14a and 14b were described as that the arrangement positions are determined in the server device 100 (the item arrangement information in FIG. 5). The item arrangement information can also be such that different item arrangement position information for each terminal device or for each user is generated, and processing related to the first application is performed on the basis of that information. Also, item arrangement information common among all terminal devices or all users, or among a plurality of terminal devices or a plurality of users (for example, among all terminal devices or all users present in a prescribed geographical range) can be generated so that processing related to the first application can be performed.

Figure 23:
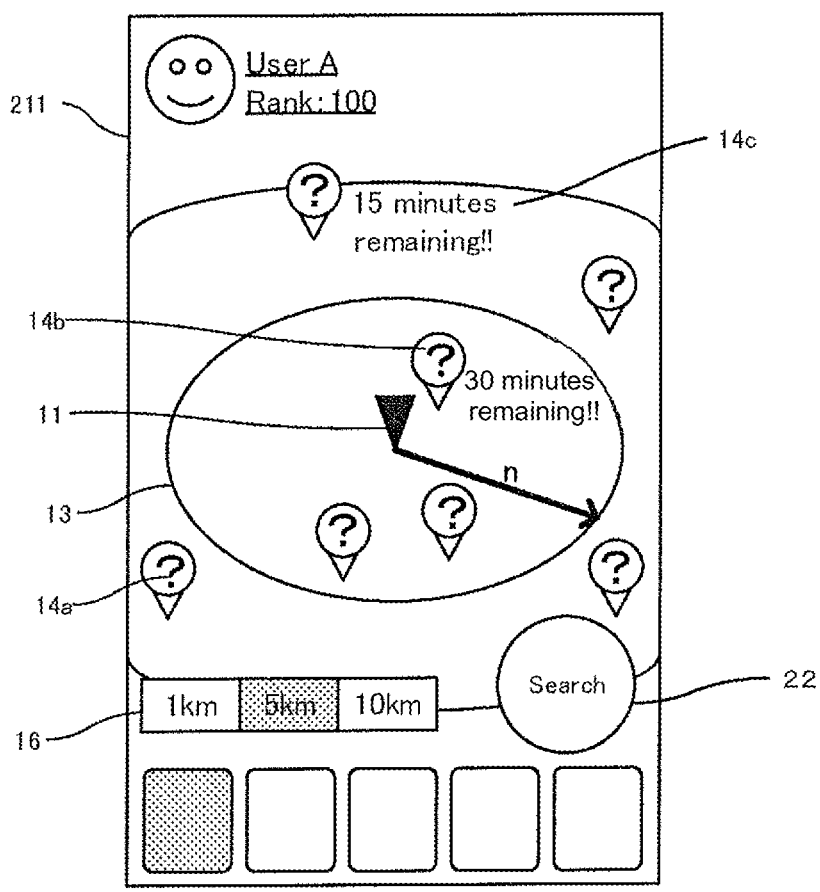
FIG. 23 is a diagram illustrating an example of a screen displayed on the display unit 211 of the terminal device 200.

In the above embodiments, the range of display can be suitably enlarged or reduced using a range-specifying icon 16, for example, as illustrated in FIG. 11 or FIG. 21. Also, all items in the range can be displayed in an identifiable state in accordance with a specified reduction. However, the embodiment can also be arranged so that only the fact that items are arranged in prescribed positions is temporarily indicated on the map and the class information of the items is displayed in an unrecognizable state, as illustrated in FIG. 23, and after that the class information of each item can be displayed in a recognizable state as in FIG. 11 or FIG. 21 by detecting pressing of the search icon 22 by the user. As one example of such a display, the terminal device 200 transmits the position information to the server device 100 by startup of the first application, and the server device 100 transmits the item information to the terminal device 200 on the basis of that position information. Also, the display is made by controlling so that the terminal device 200 displays in the state illustrated in FIG. 23 until the terminal device 200 detects pressing of the search icon 22 by the user, and displays in the state illustrated in FIG. 11 or FIG. 21 by detection of pressing of the search icon 22.

6. Miscellaneous

The system according to the present disclosure was described with first and second embodiments, as well as with other embodiments, but the system can be configured by suitably combining or replacing each element described in the embodiments.

The processing and procedures described in the present specification can be realized not only by that which is explicitly described in the embodiments, but also by software, hardware, or combinations of these. Specifically, the processing and procedures described in the present specification is realized by packaging the logic that corresponds to the processing in integrated circuits, volatile memories, nonvolatile memories, magnetic disks, optical storage, or other media. Also, the processing and procedures described in the present specification can be packaged as computer programs, and can be executed on various kinds of computers including terminal devices and server devices.

Although the processing and procedures described in the present specification are described to the effect of being executed by a single device, software, component, or module, such processing and procedures can be executed by a plurality of devices, a plurality of software, a plurality of components, and/or a plurality of modules. Also, although the various kinds of information described in the present specification are described to the effect of being stored in a single memory unit, such information can be stored being distributed across a plurality of memory units provided in a single device or a plurality of memory units distributed across a plurality of devices. Furthermore, the elements of software and hardware described in the present specification can be unified into a smaller number of constituent elements or divided into a greater number of constituent elements.

What is claimed is:

1. A server device comprising:
   a communication device configured to receive, from a terminal device, position information indicating a real world position of the terminal device, the terminal device being held by a first user, a first application being executed in the terminal device;
   a memory configured to store non-transitory computer-readable instructions and a plurality of items corresponding to predetermined locations in the real world; and
   a processor configured to execute the non-transitory computer-readable instructions so as to:
      cause the communication device to receive the position information of the terminal device in the real world;
      determine one or more selectable items among the plurality of items based on the position information, the one or more selectable items being located within a predetermined distance from the terminal device in the real world;
      cause the terminal device to select one or more selected items among the one or more selectable items;
      receive the one or more selected items from the terminal device via the communication device;
      determine privilege information based on the one or more selected items; and
      send the privilege information to the terminal device via the communication device,
   wherein the privilege information is usable in a second application different from the first application, and the second application is executable in the terminal device by the first user,
   the predetermined locations corresponding to the plurality of items are different from user locations corresponding to other users in the real world,
   wherein the second application is a game application that includes one or more stages and advances a game by clearing a prescribed mission arranged in correspondence with each stage of the one or more stages,
   the terminal device is configured to use the privilege information so that a stage game on a specific stage of the one or more stages is executable in the terminal device by the first user,
   wherein the specific stage is executed only in a first predetermined period, and
   the terminal device is configured to execute the specific stage at a time outside the first predetermined period by using the privilege information.

2. The server device according to claim 1, wherein the processor is configured to send the privilege information to the terminal device when a number of the one or more selected items reaches a predetermined number.

3. The server device according to claim 1, wherein the processor is configured to cause the terminal device to select the one or more selected items only in a second predetermined period.

4. The server device according to claim 1, wherein the processor is configured to receive link information regarding a linked operation between the first and second applications from the terminal device via the communication device, and the processor is configured to cause the terminal device to select the one or more selected items only when the processor receives the link information from the terminal device.

5. The server device according to claim 1,
wherein the memory is further configured to store first user information of the first user with respect to the first application and store second user information of the first user with respect to the second application,
the processor is configured to receive link information regarding a linked operation between the first and second applications from the terminal device via the communication device, and
the processor is configured to cause the terminal device to execute the first application by using the second user information when the processor receives the link information from the terminal device.

6. A computer program product embodying non-transitory computer-readable instructions stored on a non-transitory computer-readable medium for causing a computer to execute a process by a processor so as to perform the steps of:
receiving, from a terminal device, position information indicating a real world position of the terminal device, the terminal device being held by a first user, a first application being executed in the terminal device;
determining one or more selectable items among a plurality of items based on the position information, the plurality of items corresponding to predetermined locations in the real world, the one or more selectable items being located within a predetermined distance from the terminal device in the real world;
causing the terminal device to select one or more selected items among the one or more selectable items;
receiving the one or more selected items from the terminal device;
determining privilege information based on the one or more selected items; and
sending the privilege information to the terminal device,
wherein the privilege information is usable in a second application different from the first application, and the second application is executable in the terminal device by the first user, and
the predetermined locations corresponding to the plurality of items are different from user locations corresponding to other users in the real world,
wherein the second application is a game application that includes one or more stages and advances a game by clearing a prescribed mission arranged in correspondence with each stage of the one or more stages,
a stage game on a specific stage of the one or more stages is executable in the terminal device by the first user,
wherein the specific stage is executed only in a first predetermined period, and
the specific stage is executable at a time outside the first predetermined period by using the privilege information in the terminal device.

7. A method for causing a processor to execute non-transitory computer-readable instructions stored in a memory, the method comprising executing on the processor the steps of:
receiving, from a terminal device, position information indicating a real world position of the terminal device, the terminal device being held by a first user, a first application being executed in the terminal device;
determining one or more selectable items among a plurality of items based on the position information, the plurality of items being stored in the memory, the plurality of items corresponding to predetermined locations in the real world, the one or more selectable items being located within a predetermined distance from the terminal device in the real world;
causing the terminal device to select one or more selected items among the one or more selectable items;
receiving the one or more selected items from the terminal device;
determining privilege information based on the one or more selected items; and
sending the privilege information to the terminal device,
wherein the privilege information is usable in a second application different from the first application, and the second application is executable in the terminal device by the first user, and
the predetermined locations corresponding to the plurality of items are different from user locations corresponding to other users in the real world,
wherein the second application is a game application that includes one or more stages and advances a game by clearing a prescribed mission arranged in correspondence with each stage of the one or more stages,
a stage game on a specific stage of the one or more stages is executable in the terminal device by the first user,
wherein the specific stage is executed only in a first predetermined period, and
the specific stage is executable at a time outside the first predetermined period by using the privilege information in the terminal device.

8. The server device according to claim 1,
wherein the processor is configured to determine the privilege information by combining at least two of the one or more selected items, and the privilege information is different from the one or more selected items.

9. The computer program product according to claim 6,
wherein the privilege information is determined by combining at least two of the one or more selected items, and the privilege information is different from the one or more selected items.

10. The method according to claim 7,
wherein the privilege information is determined by combining at least two of the one or more selected items, and the privilege information is different from the one or more selected items.

11. A server device comprising:
a communication device configured to receive, from a terminal device, position information indicating a real world position of the terminal device, the terminal device being held by a first user, a first application being executed in the terminal device;
a memory configured to store non-transitory computer-readable instructions and a plurality of items corresponding to predetermined locations in the real world; and
a processor configured to execute the non-transitory computer-readable instructions so as to:
cause the communication device to receive the position information of the terminal device in the real world;
determine one or more selectable items among the plurality of items based on the position information, the one or more selectable items being located within a predetermined distance from the terminal device in the real world;
cause the terminal device to select one or more selected items among the one or more selectable items;

receive the one or more selected items from the terminal device via the communication device;
determine privilege information based on the one or more selected items; and
send the privilege information to the terminal device via the communication device,
wherein the privilege information is usable in a second application different from the first application, and the second application is executable in the terminal device by the first user,
the predetermined locations corresponding to the plurality of items are different from user locations corresponding to other users in the real world,
wherein the processor is configured to receive link information regarding a linked operation between the first and second applications from the terminal device via the communication device, and
the processor is configured to cause the terminal device to select the one or more selected items only when the processor receives the link information from the terminal device.

12. A server device comprising:
a communication device configured to receive, from a terminal device, position information indicating a real world position of the terminal device, the terminal device being held by a first user, a first application being executed in the terminal device;
a memory configured to store non-transitory computer-readable instructions and a plurality of items corresponding to predetermined locations in the real world; and
a processor configured to execute the non-transitory computer-readable instructions so as to:
cause the communication device to receive the position information of the terminal device in the real world;
determine one or more selectable items among the plurality of items based on the position information, the one or more selectable items being located within a predetermined distance from the terminal device in the real world;
cause the terminal device to select one or more selected items among the one or more selectable items;
receive the one or more selected items from the terminal device via the communication device;
determine privilege information based on the one or more selected items; and
send the privilege information to the terminal device via the communication device,
wherein the privilege information is usable in a second application different from the first application, and the second application is executable in the terminal device by the first user,
the predetermined locations corresponding to the plurality of items are different from user locations corresponding to other users in the real world,
wherein the memory is further configured to store first user information of the first user with respect to the first application and store second user information of the first user with respect to the second application,
the processor is configured to receive link information regarding a linked operation between the first and second applications from the terminal device via the communication device, and
the processor is configured to cause the terminal device to execute the first application by using the second user information when the processor receives the link information from the terminal device.

13. A computer program product embodying non-transitory computer-readable instructions stored on a non-transitory computer-readable medium for causing a computer to execute a process by a processor so as to perform the steps of:
receiving, from a terminal device, position information indicating a real world position of the terminal device, the terminal device being held by a first user, a first application being executed in the terminal device;
determining one or more selectable items among a plurality of items based on the position information, the plurality of items corresponding to predetermined locations in the real world, the one or more selectable items being located within a predetermined distance from the terminal device in the real world;
causing the terminal device to select one or more selected items among the one or more selectable items;
receiving the one or more selected items from the terminal device;
determining privilege information based on the one or more selected items; and
sending the privilege information to the terminal device,
wherein the privilege information is usable in a second application different from the first application, and the second application is executable in the terminal device by the first user,
the predetermined locations corresponding to the plurality of items are different from user locations corresponding to other users in the real world,
wherein the processor is configured to receive link information regarding a linked operation between the first and second applications from the terminal device, and
the processor is configured to cause the terminal device to select the one or more selected items only when the processor receives the link information from the terminal device.

14. A computer program product embodying non-transitory computer-readable instructions stored on a non-transitory computer-readable medium for causing a computer to execute a process by a processor so as to perform the steps of:
receiving, from a terminal device, position information indicating a real world position of the terminal device, the terminal device being held by a first user, a first application being executed in the terminal device;
determining one or more selectable items among a plurality of items based on the position information, the plurality of items corresponding to predetermined locations in the real world, the one or more selectable items being located within a predetermined distance from the terminal device in the real world;
causing the terminal device to select one or more selected items among the one or more selectable items;
receiving the one or more selected items from the terminal device;
determining privilege information based on the one or more selected items; and
sending the privilege information to the terminal device,
wherein the privilege information is usable in a second application different from the first application, and the second application is executable in the terminal device by the first user,
the predetermined locations corresponding to the plurality of items are different from user locations corresponding to other users in the real world,
wherein first user information of the first user with respect to the first application and second user information of the first user with respect to the second application are configured to be stored in the terminal device, the processor is configured to receive link information regarding a linked operation between the first and second applications from the terminal device, and the processor is configured to cause the terminal device to execute the first application by using the second user information when the processor receives the link information from the terminal device.

15. A method for causing a processor to execute non-transitory computer-readable instructions stored in a memory, the method comprising executing on the processor the steps of:

receiving, from a terminal device, position information indicating a real world position of the terminal device, the terminal device being held by a first user, a first application being executed in the terminal device;

determining one or more selectable items among a plurality of items based on the position information, the plurality of items being stored in the memory, the plurality of items corresponding to predetermined locations in the real world, the one or more selectable items being located within a predetermined distance from the terminal device in the real world;

causing the terminal device to select one or more selected items among the one or more selectable items;

receiving the one or more selected items from the terminal device;

determining privilege information based on the one or more selected items; and sending the privilege information to the terminal device, wherein the privilege information is usable in a second application different from the first application, and the second application is executable in the terminal device by the first user, the predetermined locations corresponding to the plurality of items are different from user locations corresponding to other users in the real world, wherein the processor is configured to receive link information regarding a linked operation between the first and second applications from the terminal device, and the processor is configured to cause the terminal device to select the one or more selected items only when the processor receives the link information from the terminal device.

16. A method for causing a processor to execute non-transitory computer-readable instructions stored in a memory, the method comprising executing on the processor the steps of:

receiving, from a terminal device, position information indicating a real world position of the terminal device, the terminal device being held by a first user, a first application being executed in the terminal device;

determining one or more selectable items among a plurality of items based on the position information, the plurality of items being stored in the memory, the plurality of items corresponding to predetermined locations in the real world, the one or more selectable items being located within a predetermined distance from the terminal device in the real world;

causing the terminal device to select one or more selected items among the one or more selectable items;

receiving the one or more selected items from the terminal device;

determining privilege information based on the one or more selected items; and sending the privilege information to the terminal device, wherein the privilege information is usable in a second application different from the first application, and the second application is executable in the terminal device by the first user, the predetermined locations corresponding to the plurality of items are different from user locations corresponding to other users in the real world, wherein first user information of the first user with respect to the first application and second user information of the first user with respect to the second application are configured to be stored in the terminal device, the processor is configured to receive link information regarding a linked operation between the first and second applications from the terminal device, and the processor is configured to cause the terminal device to execute the first application by using the second user information when the processor receives the link information from the terminal device.

* * * * *